(12) United States Patent
Johnson et al.

(10) Patent No.: US 12,031,888 B2
(45) Date of Patent: Jul. 9, 2024

(54) METHANE WATCHDOG SYSTEM, A COST EFFECTIVE APPROACH TO LONGWALL METHANE MONITORING AND CONTROL

(71) Applicant: West Virginia University Board of Governors on Behalf of West Virginia University, Morgantown, WV (US)

(72) Inventors: Derek Johnson, Pentress, WV (US); Nigel Clark, Morgantown, WV (US); Amber Barr, Summit Point, WV (US); Brian Cappellini, Morgantown, WV (US)

(73) Assignee: WEST VIRGINIA UNIVERSITY, Morgantown, WV (US)

( * ) Notice: Subject to any disclaimer, the term of this patent is extended or adjusted under 35 U.S.C. 154(b) by 293 days.

(21) Appl. No.: 17/308,341

(22) Filed: May 5, 2021

(65) Prior Publication Data

US 2021/0348988 A1 Nov. 11, 2021

Related U.S. Application Data

(60) Provisional application No. 63/020,817, filed on May 6, 2020.

(51) Int. Cl.
*G01N 1/24* (2006.01)
*E21C 35/04* (2006.01)
(Continued)

(52) U.S. Cl.
CPC ............... *G01N 1/24* (2013.01); *E21C 35/04* (2013.01); *E21C 35/24* (2013.01); *E21F 1/006* (2013.01)

(58) Field of Classification Search
CPC .. G01N 5/24; G01N 1/24; E21C 35/04; E21C 35/24; E21C 41/18; E21F 1/006; E21F 7/00
See application file for complete search history.

(56) References Cited

U.S. PATENT DOCUMENTS 3,683,255 A 8/1972 Schroeder
4,485,666 A * 12/1984 Higgins ............. G01N 33/0032
422/94

(Continued)

OTHER PUBLICATIONS

Tube bundle system: for monitoring of coal mine atmosphere R. Karl Zipf Jr. Min Eng. Author manuscript; available in PMC Aug. 22, 2015 (Year: 2015).*

(Continued)

*Primary Examiner* — Janine M Kreck
(74) *Attorney, Agent, or Firm* — Thomas | Horstemeyer, LLP

(57) ABSTRACT

Various examples are provided related to methane detection in harsh environments. In one example, a method includes drawing a sample of air from at least one first location; delivering the sample to a volume within a sensor block at a second location, where the sensor block includes a gas concentration sensor in communication with the volume; and where a vacuum is applied to the volume within the sensor block to facilitate delivery of the sample to the second location. In another example, a system includes a sampling unit that houses a sensor block, where a sample tube is coupled to an inlet of the sensor block, which includes a gas concentration sensor; an ejector that facilitates delivery of a sample of air from the first location via the sample tube; and a control unit that can receive a gas concentration sensor output from the sampling unit for processing.

20 Claims, 24 Drawing Sheets

(51) Int. Cl.
*E21C 35/24* (2006.01)
*E21F 1/00* (2006.01)

(56) References Cited

U.S. PATENT DOCUMENTS

| | | | | |
|---|---|---|---|---|
| 4,569,235 | A | * | 2/1986 | Conkle .............. G01N 33/0016 73/863.03 |
| 4,754,142 | A | * | 6/1988 | Cooper .............. G01N 21/3504 250/343 |
| 5,611,844 | A | | 3/1997 | Troost et al. |
| 6,168,240 | B1 | | 1/2001 | Stickel et al. |
| 8,692,997 | B2 | | 4/2014 | Tkachuk et al. |
| 10,089,848 | B2 | | 10/2018 | Albinger et al. |
| 2016/0024922 | A1 | * | 1/2016 | Schuster .................. E21F 5/02 454/168 |

OTHER PUBLICATIONS

CDC "What is the health and safety problem?" The National Institute for Occupational Safety and Health (NIOSH) (Sep. 1, 2020).

Mandal, Ranjeet, et al. "Application of gas monitoring sensors in underground coal mines and hazardous areas." International Journal of Computer Technology and Electronics Engineering 3.3 (2013): 9-23.

WV News "West Virginia University researchers developing methane monitoring network to increase mine safety" wvnews.com, (Oct. 6, 2020).

West Virginia University "WVU engineers receive funding to improve methane sensor technology in longwall mines" WBOY. com (Oct. 19, 2020).

University of Pittsburgh "Thirty-Seventh Annual international Pittsburgh Coal Conference University of Pittsburgh Swanson School of Engineering—Abstracts Booklet—Clean Coal-based Energy/Fuels and the Environment" (Sep. 2020).

University of Pittsburgh "Thirty-Seventh Annual international Pittsburgh Coal Conference University of Pittsburgh Swanson School of Engineering—Technical Program—Clean Coal-based Energy/Fuels and the Environment" (Sep. 2020).

Cappellini, Brian Philip. "Improving Real-time Methane Monitoring in Longwall Coal Mines Through System Response Characterization of a Multi-Nodal Methane Detection Network." (2021).

Barr; et al "Design and Development of Multi-Nodal Methane Monitoring System for Improved Mine Safety" West Virginia University (2020).

Cappellini "Improving Safety and Control Along the Longwall with the Methane Watchdog System (MWS): An evaluation of potential and utilization" West Virginia University (2021).

Kissell, Fred N., et al. "Handbook for methane control in mining." (2006).

Cappellini, Brian Philip. "Graduate Theses, Dissertations, and Problem Reports Improving Real-time Methane Monitoring in Longwall Coal Mines Through System Response Characterization of a Multi-Nodal Methane Detection Network." (2021).

Barr; et al "Graduate Theses, Dissertations, and Problem Reports Design and Development of Multi-Nodal Methane Monitoring System for Improved Mine Safety" West Virginia University (2020).

* cited by examiner

|  | 3 SLPM | | 1.4 SLPM | | 1.3 SLPM | | 1.2 SLPM | |
|---|---|---|---|---|---|---|---|---|
|  | MOS | IRS | MOS | IRS | MOS | IRS | MOS | IRS |
| Rise Time [s] | 13 | 29 | 12 | 29 | 13 | 30 | 15 | 26 |
| Decay Time [s] | 188 | 83 | 150 | 60 | 153 | 42 | 113 | 62 |

|  | Method 1 | | Method 2 | | Differences | |
|---|---|---|---|---|---|---|
|  | MOS | IRS | MOS | IRS | MOS | IRS |
| Rise Time [s] | 23.8 | 34.0 | 13.3 | 28.5 | 9.5 | 5.5 |
| Decay Time [s] | 193.0 | 61.5 | 151.0 | 61.8 | 42 | 0.3 |

| Sampling Node # | Average Response | | Percent Difference [%] | |
|---|---|---|---|---|
| | MOS [ppm] | IRS [ppm] | | |
| 1 | 15.008 | 14.064 | -6.49 | Good |
| 2 | 13.626 | 12.672 | -7.25 | Good |
| 3 | 20.629 | 19.108 | -7.66 | Good |
| 4 | 14.889 | 14.357 | -3.64 | Good |
| 5 | 17.466 | 19.441 | 10.70 | |
| 6 | 7696 | 8536 | 10.35 | |
| 7 | 13.115 | 14.464 | 9.78 | Good |
| 8 | 14.135 | 14.280 | 1.02 | Good |
| 9 | 10.188 | 12.518 | 20.52 | Bad |
| 10 | 14.901 | 16.190 | 8.30 | Good |

METHANE WATCHDOG SYSTEM, A COST EFFECTIVE APPROACH TO LONGWALL METHANE MONITORING AND CONTROL

CROSS REFERENCE TO RELATED APPLICATIONS

This application claims priority to, and the benefit of, co-pending U.S. provisional application entitled "Methane Watchdog System, A Cost Effective Approach to Longwall Methane Monitoring and Control" having Ser. No. 63/020,817, filed May 6, 2020, which is hereby incorporated by reference in its entirety.

BACKGROUND

Methane in coal mines may be released locally, particularly near the cutting head of mechanical mine machinery (typically a longwall arrangement, though applicable to any gassy mine) or from gob in a zone which has already been mined. There is an urgent need to stop production if an explosive pocket of gas is produced in an area where there may be an ignition source such as a shearer. As an alternative to stopping production, the explosive gas may be diluted and made safe by enabling local air movement with extractors or fans or increasing ventilation. As a further alternative the production rate may be reduced or stopped.

However, fires and explosions are still the most feared hazards in underground gassy mining operations. Thirteen of 15 coal mine disasters (i.e., accidents with 5 or more fatalities) since 1980 resulted from fires and explosions. The most recent coal mine disaster in the U.S. occurred at Upper Big Branch Mine (Raleigh County, West Virginia) where 29 miners lost their lives nearly instantly because of an explosion initiated by methane ignition near the tailgate of a longwall face that intensified with the participation of coal dust. Therefore, methane still presents hazardous conditions in the longwall faces where the coal is cut, loaded, and transported in much higher production rates than other mining methods used in the coal industry. In many cases, although the suspended coal dust may be explosive, or a lean mixture may be close to an explosive limit, there is no catastrophic event because a strong ignition source is required to ignite the atmosphere. Ignition of a localized pocket of richer gas can ignite a surrounding mixture.

Currently methane concentrations are detected with stationary or portable handheld instruments that typically work on the principle of catalytic oxidation. However, stationary gas monitors measure a more averaged concentration for general ventilation, and portable samplers are intended for use over a shift and move with the worker. Concentrations are checked at different locations periodically by workers and/or foremen. The current federal standard mandates that methane concentrations be controlled under 1.0% in any active part of underground mines other than the bleeder system where up to 2% is allowed. In all working faces, powered equipment should be de-energized when 1.0% methane is detected while electric power shall be disconnected when 1.5% methane is present. Details on mine air requirements are set forth in the Code of Federal Regulations (CFR) Part 30 Section 75. In reality, longwall mines often adopt their own standard to control the methane concentration to below 0.7 to 0.8%, so that mining operation is not frequently interrupted because of highly variable methane emissions at the working face.

Currently, for longwall operations, industry usually relies on a single methane sensor located in the middle of the shearer. Note that methane is explosive in air between 5 and 15% by volume. Currently, MSHA (Mine Safety and Health Administration) regulations require that only one methane monitor be mounted on the longwall shearer in a longwall face. The location of the monitor in a typical longwall face setting could be between 5 and 10 ft. away from the coal face and is unable to detect all zones of higher methane concentrations (near the front shield tip or near the rear of the shield), possibly explosive in nature. Therefore, current methane monitoring methods and equipment are geared toward MSHA compliance rather than local measurement. As such, centrally located sensors may under concentrations that occur in areas of concern.

Although these hazards exist, longwall mining in underground coal mines is considered the safest and most productive mining method. However, due to its high productivity, the methane emissions from the large newly exposed coal face and from the gob area are often excessively high. As the longwall panels become wider (with the widest currently being 1,600 feet) and longer, the total amount of methane emitted from the longwall panel tends to increase proportionally with the area of the panel.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure describes various embodiments of systems, apparatuses, and methods for detection of methane concentration in a harsh environment in order to improve the understanding of methane concentrations along a longwall face to increase the safety and health of mineworkers and equipment. In accordance with the present disclosure, embodiments of an exemplary methane detection system and method use an array of sampling points from which air samples are drawn and sent to a respective concentration measurement sampling unit having a plurality of environmental sensors, such as sensors that report methane gas concentration or presence, hydrocarbon concentration or presence, pressure, temperature, humidity, or other variables.

In accordance with embodiments of the present disclosure, an exemplary methane detection system measures methane concentrations at reference locations, such as near a shearer head or in the future path of a shearer. Such a system is reliable, robust and continuous and can be interfaced directly with one or more control systems to stop operations in an automated fashion. The system reduces the likelihood of mine fires, mine dust explosions, and worker injury or death and reduces the likelihood of stoppages through better management of ventilation and cutter speed. The approach may be extended to the measurement of concentrations of other gases in other harsh or hostile industrial environments. Accordingly, the present disclosure describes various embodiments of a low-cost, multi-nodal methane detection system to ultimately improve the health and safety of longwall coal mining operations though applicable to other gassy environments.

An exemplary system features a reliable and durable nodal methane-sensing network to monitor methane concentrations and velocity continuously along a full length of a longwall face. The system will measure, record, and report on discrete methane concentrations in nearly real time, along the front and/or rear ends of the canopy of the shields. The measured methane concentration distribution along or adjacent to the front tips of the shield canopy can be used as an algorithm input to decide whether an action should be taken to avoid danger. For example, the shearer may be de-energized before advancing into potentially explosive methane-air pockets. The methane concentration distribution along the rear end of the shield canopy (the front edge of longwall gob) and its development trend over time enables the development of an improved ventilation plan. In addition, historical data on methane emissions can be used as a new metric by which to develop mining operations for improved safety. The historical data can also be used to train a strategy or configure data management software to increase the reliability of prediction for a specific mine or longwall application.

Figure 1:
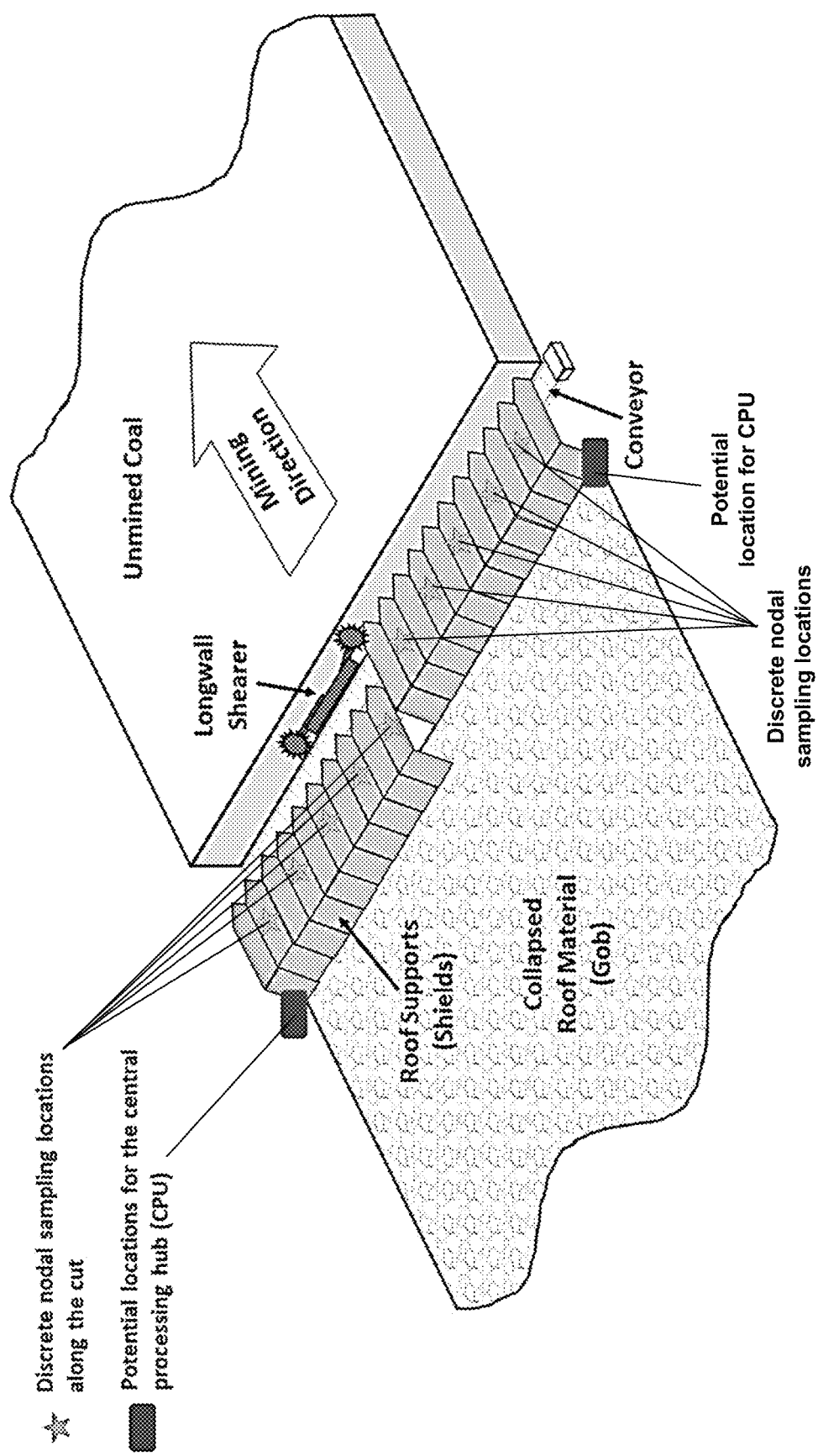
FIG. 1 shows an exemplary distribution of a multi-nodal sampling approach for an exemplary methane detection system in accordance with embodiments of the present disclosure.

An example of the multi-nodal system is shown in FIG. 1. The figure shows an example of an equally spaced system, though unequally space or tailgate weighted distributions can be used. The goal of the multi-nodal approach is to enable continuous sampling at multiple locations to improve mine safety as opposed to a current single point or intermittent measurement approaches. Information from each sampling unit may be considered singly or employed as an input to a model or algorithm that determines the necessity for ceasing and/or slowing production or increasing ventilation.

While longwall mining in underground coal mines is considered the safest and most productive mining method, the methane emissions from the large newly exposed coal face and from the gob area are often high. As the longwall panels become wider (with the widest currently being 1,600 feet) and longer, the total amount of methane emitted from the longwall panel tends to increase proportionally with the area of the panel. As a result, most of the longwall coal mines in the U.S. must rely on multiple degasification methods to lower the methane content before longwall mining operations can be safely conducted in the coal seams.

Along the longwall face, a methane liberation rate of up to 2 to 4 cubic feet per minute (CFM) per $ft^2$ is encountered from the freshly exposed coal surface as the coal is cut by the shearer and the methane concentration gradually diminishes as the shearer moves away. Because of methane's lower density and more complex flows of ventilation air near the shearer, it is possible to form pockets of explosive methane concentration near the front corner of roofline and coal face, especially when caved pockets form at the upper corner due to severe face spalling. If the shearer cuts into unexpected hard rock roof, sparks could ignite methane and small-scale explosions can occur, as various mine records show.

In a longwall panel, high methane concentrations of 90% or more could form in the central part of the gob area. Such high concentrations are above the Upper Explosive Limit (UEL) of about 15% and are acceptable so long as they do not migrate towards the rear of the panels. However, the methane concentration along the gob edges immediately behind the longwall face and beside the panel headgate and tailgate are normally controlled by ventilation to under 1.0%. In a typical longwall gob, this explosive zone is closest to the longwall face near the tailgate and face corner. If not properly controlled, this explosive zone could even penetrate into the longwall face causing a very hazardous condition as in the case of the mine explosion at the Upper Big Branch mine. The current bleeder ventilation system employed in majority of the U.S. longwall mines keeps the 5% methane concentration sufficiently distant from the longwall face while not over-ventilating the gob area. Coal bed gas typically contains very low concentrations of hydrocarbon gases other than methane, typically ethane, but these other gases will contribute, even if minimally, to the precise UEL and LEL of the coal bed gas.

Currently, MSHA regulations require that only one methane monitor be mounted on the longwall shearer in a longwall face. The location of the monitor in a typical longwall face setting could be between 5 and 10 ft. away from the coal face and at around the midpoint in the height of the seam. Therefore, a single gas monitor is unable to detect the zones of higher methane concentrations, possibly explosive, either at the front upper (top) corner of the longwall face and along the front longwall gob edge immediately behind the shields. Detection rates of small zones of high concentration, may therefore also be happenstance or statistical in nature. In addition, the response time of current sensors may be 10 or more seconds—which reduces their spatial reliability. For example, if the gas monitor on the shearer detects an explosive methane condition, the cutting drums (or other potential ignition source) may have already penetrated the explosive gas zone due to the delayed response from a single point measurement. Therefore, to improve further the safety at the longwall mining operations, a more responsive, multi-nodal gas monitoring system must be developed and deployed to control ventilation at the longwall faces and serve to proactively (as opposed to reactively) control shearer power to avoid explosive conditions and reduce equipment downtime.

In contemporary systems, methane is generally measured in one or two locations—at the shearer and the tailgate. Early research focused on optimal sampling locations near the shearer but found that sensors typically failed or fowled nearer the shearer edge where concentrations were highest and subsequently suggested a location nearer the back of the shearer. (See Cecala, A. B., Zimmer, J. A., Thimons, E. D, "Determination of optimal longwall face methane monitoring locations. In: Proceedings of the Sixth U.S. Mine Ventilation Symposium" (Salt Lake City, UT, Jun. 21-23, 1993)).

Correspondingly, embodiments of the methane detection system of the present disclosure provide an inexpensive and accurate nodal monitoring system that will eliminate the downfalls of current technologies and deployment strategies. Such a nodal monitoring system can easily be integrated with current technologies to improve mine safety, and be combined with flow data to compute instantaneous methane liberation rates. By measuring methane across the entire longwall (with the knowledge of the methane's spatial and temporal distribution along the face line), the methane detection system can prevent the longwall shearer from cutting into potentially explosive pockets. Further, using processing with appropriate algorithms, the signals from the sensors can be combined to increase reliability and rapidity of reporting. Accordingly, embodiments of the systems and methods for methane detection can overcome current methane monitoring limitations by developing a robust and cost-effective methane-monitoring network that can be used to predict and detect high concentrations, de-energize the shearer, and interface with automated ventilation control units.

An exemplary methane detection system and its major components can be found in FIGS. 2-5. A listing of the various components include Mine Headgate (1), Mine Tailgate (2), Gob Area (3), Longwall Face (4), Sampling Units (5), Sampling Nodes (6), Methane Plume (7), Sampling Node (8) Exposed to a Methane Plume, Sample Signal Communication (9) with Central Hub, Control Unit (10) (also referred as Central Processing Hub (CPH) (Computer and User Interface)); Data Storage (11); Alarm/Relay System (12); Shearer (13); Direction of Shearer (14), Shield (15) (Shaded Area-Side View), 3-way Valve (16), Sensor Block (17), DC/DC Converter (18), ND Converter (19), Thermocouple Transmitter (20), 5 VDC Distribution (21), 12/24 VDC Distribution (22), 3-way Valve Inlet 1 (23) (From Gob Node); 3-way Valve Inlet 2 (24) (From Face Node); 3-way Valve Outlet (25); Sensor block inlet (26); Sensor block outlet (27); relative humidity (RH) Sensor (28); Pressure Sensor (29); Metal Oxide Sensor (MOS) (30); Thermocouple (31); Sampling Unit Inlet 1 (32) (From Gob Node); Sampling Unit Inlet 2 (33) (From Face Node); Sampling Unit Outlet (34) to Motive Sampler (pump, eductor/ejector, etc.); Infrared Sensor (IRS) (35); IRS Mounting Plate (36); Relay (37); Communication Port 1 (38) (Unit to CPH); Communication Port 2 (39) (Unit to Unit); and MOS Mounting Plate (40).

Figure 2:
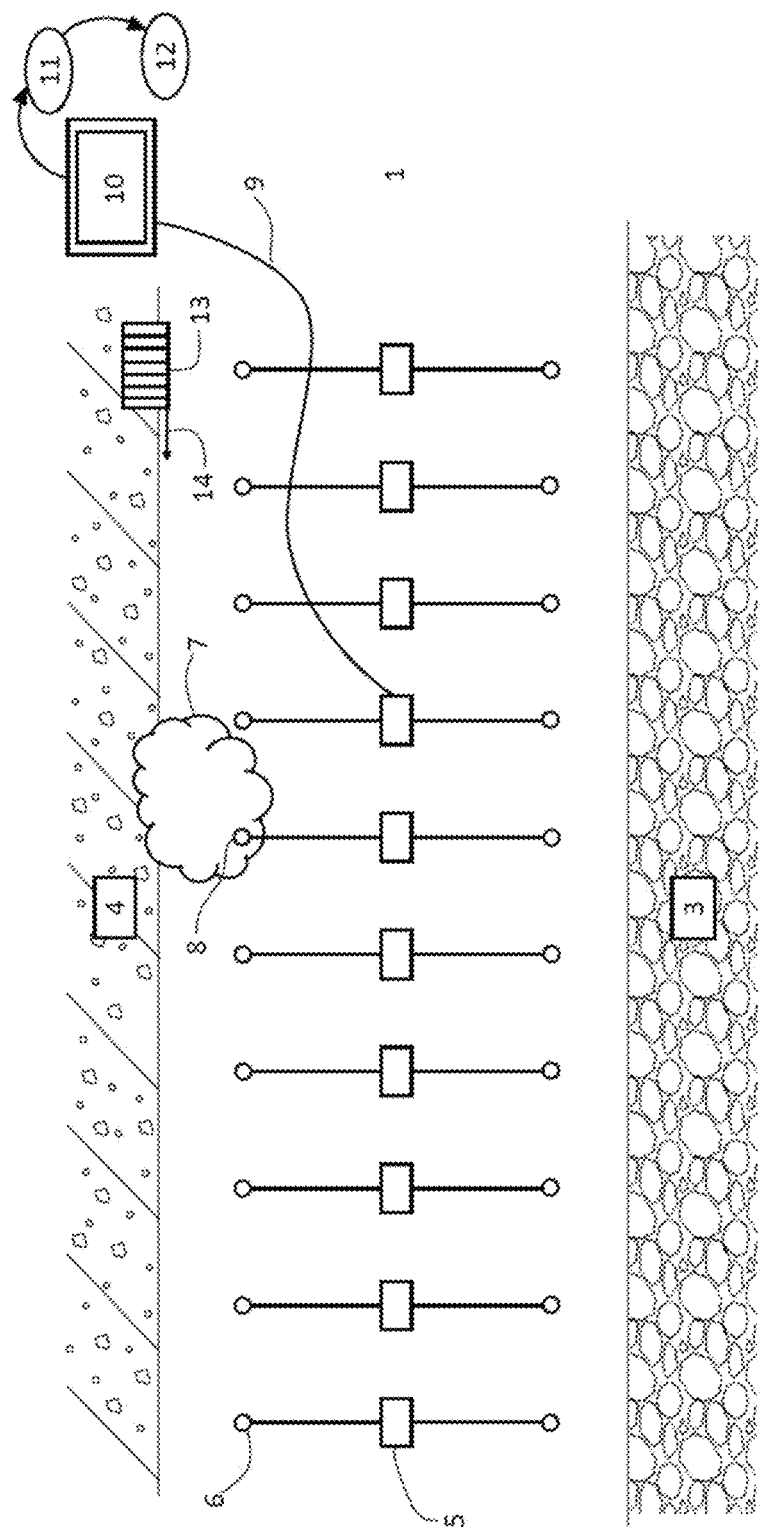
FIGS. 2-5 show an exemplary methane detection system and its major components in accordance with embodiments of the present disclosure.
Figure 3:
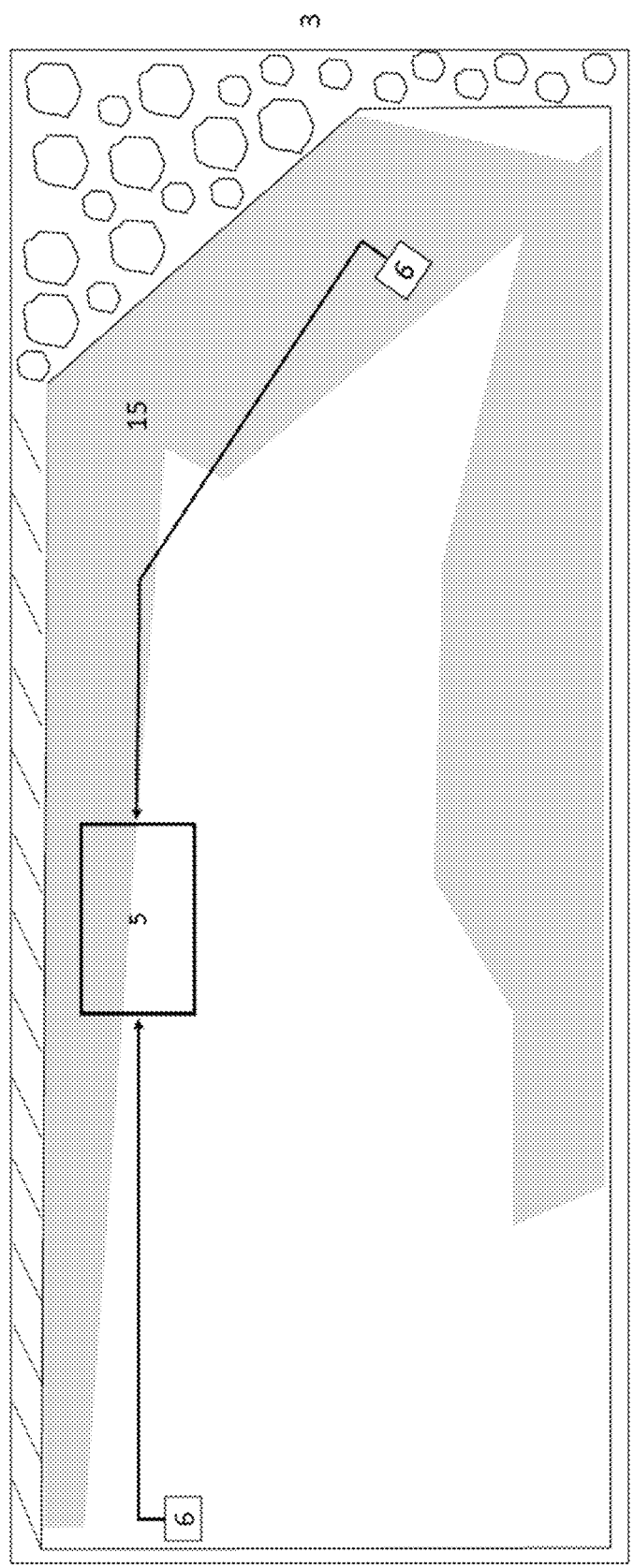

Referring to FIGS. 1-3, the figures present an example of the nodal array along the entire coal seam cut to overcome the limitations of single-point measurements, in which a multi-nodal measurement approach is deployed whereby multiple sensors (28-31 and 35) in sampling units (5) are located along the coal face and in areas prone to high methane concentrations. Each nodal sensor (28-31 and 35) in the sampling unit (5) will communicate with the longwall control unit computer (10) located at the headgate or another safe location (1), which will record, analyze, and display methane concentrations. The control unit (10) will use sensor readings to alert operators (visually and audibly) and de-energize or to slow the shearer. Sensor locations will include along the front (shearing area) and rear (gob area) of the shields (15) and near the head (1) and tailgates (2). The sampling unit (5) can alternate sampling between the two locations at, e.g., a prescribed time interval as controlled by the three-way valve (16). For example, when the valve (16) is energized, the sampling unit (4) can sample from the gob and when it was deenergized, the sampling unit (4) can sample from the face. This can provide a default status that samples the mining face for enhanced safety in the case of a disabled valve. The sample travels through a sampling tube from the sampling location to the sampling unit (5). The end of each tube at the sampling locations can be connected to an enclosed filter to protect against coal dust and water droplets.

The measured methane concentration values along the rear end of the longwall shields (15) and its development history can be used to control the bleeder or main ventilation systems. Proper control of the ventilation systems can achieve the following two important mine safety goals: (1) the front of the dangerous methane zone in the mine gob area (3), especially near the face/tailgate corner and during sudden atmospheric pressure drop, is kept sufficient distance away from the longwall face (4) where coal is cut, and (2) air flows into the gob area (3) are not excessive, to prevent spontaneous combustion of the coal debris left in the gob.

Each sampling node (6) can report through a connection (e.g., wired, optical, or wireless connection) to the central control unit (10). The control unit (10) includes a central processing unit (CPU) and recording equipment along with electronic control for the shearer (13), output signals for recommending changes of ventilation regulators, and a display that would include concentration mapping and alarms (12). A central location at the headgate (1) could be employed. In addition to measuring across the face (4), one node will likely be located at the headgate (1) with or near the control unit (10). While this area is typically provided with the freshest air, when the shearer (13) approaches the headgate (1) to make the headgate cutout, excessive methane concentrations can occur—over double the average methane concentration along the face. (See Cecala A B, Jayaraman N I, "Modified shearer-clearer system for dust and methane control," Pittsburgh, PA: U.S. Department of the Interior, Bureau of Mines, IC 9404. NTIS No. PB95104873 (1994)). This is due to the sharp 90-degree turn at the headgate/face corner that changes the dilution airflow pattern making the main stream of ventilation air to flow around the headgate and shearer profile.

An exemplary methane detection system is comprised of low-cost methane sensors (35), sampling nodes (6), communication and electrical networks (9), a control unit (10), and a visual interface. For the present disclosure, a system capable of measuring methane or hydrocarbons at up to (but not limited to) 10 discrete locations is described. Each location includes a sampling system, which could be active and passive and will likely include filtration capabilities to extend sensor life and prevent flow passage blockage. Filters may be utilized to ensure that particulates such as coal dust and water droplets do not impinge the sampler circuit leading to premature failure or false positive readings. The filters can be selected based upon flowrate effects, coal dust loading, and moisture loading. The sampling system is a dynamic device that may change its response to transient methane concentrations as a result of retention of matter in flow passages. This change in response may be due to partial plugging of the flow passage and the ability of deposited material to contribute to methane hang-up. Correction for these changes may be achieved through transient calibrations or adaptive learning strategies. In various embodiments, passive samplers may use ventilation air to induce flow, while active samplers may use compressed air or water to induce flow within an ejector. Each sampling location can have a quick disconnect system for easy installation and replacement of the sensor (28, 29, 30) and filter if applicable. In various embodiments, the connection network includes shielded low voltage DC power and signal wires or other communication methods, such as optical cables. Each sampling node (6) can be connected to a centrally located control unit (10). The control unit (10) can record methane data from each node and have analog or digital output capabilities for communications with other systems and for shearer power control. Along with the control unit (10), the system can also include a visual interface that allows operators to view methane concentrations in nearly real time while also plotting historical methane data—both in time and space.

The shield systems (15) used in longwall mining are themselves modular by design in that more units are deployed for longer faces. Correspondingly, in some embodiments, the nodes (6) are modular and low voltage signals and communications conduits can be expanded as the number of shields are expanded. Sensor power and communications may be able to be integrated into the existing shield architecture. However, in various embodiments, a separate electrical and communications interface system will be included. If a powered ejector system is deployed, a combined ejector and wiring system may be deployed on active shields (15). Such a wiring/communications system can be configured to operate nodes in parallel such that if any node were damaged or is being serviced/calibrated, the remaining nodes would remain functional. In various embodiments, an optical fiber may be used in place of electrical wires to transmit data communications.

By having a modular system, a user can increase sensor counts in groups, such as groups of up to 10 at a time, in various embodiments. For example, commercially available power over Ethernet analog devices can multiplex 10 analog signals (4-20 mA or 0-5V) at a rate of 1 Hz per channel, in which a DAQ card can receive 10 nodes at a time. Thus, in an exemplary embodiment, 2 to 60 or more sampling nodes can be monitored that represent key locations at or along the longwall face in areas of greatest concern (tail/headgate, gob line, and along shearer and face).

In various embodiments, an exemplary methane detection system can (at a minimum): 1) Collect methane concentration from samplers at ten nodes (6); 2) Process and record the nodal methane concentration; 3) Report on estimated airflow rate across the face (4); 4) Plot real time and historical methane concentration data; 5) Control a relay (37) that represents de-energizing the shearer (13); 6) Function with a failed sensor (28, 29, 30, 31, 35) and demonstrate that a failure has occurred. A key function of the system will be modularity such that the deployed system in real longwall operations could have upwards of 50-60 or more sensors, in various embodiments.

Figure 4A:
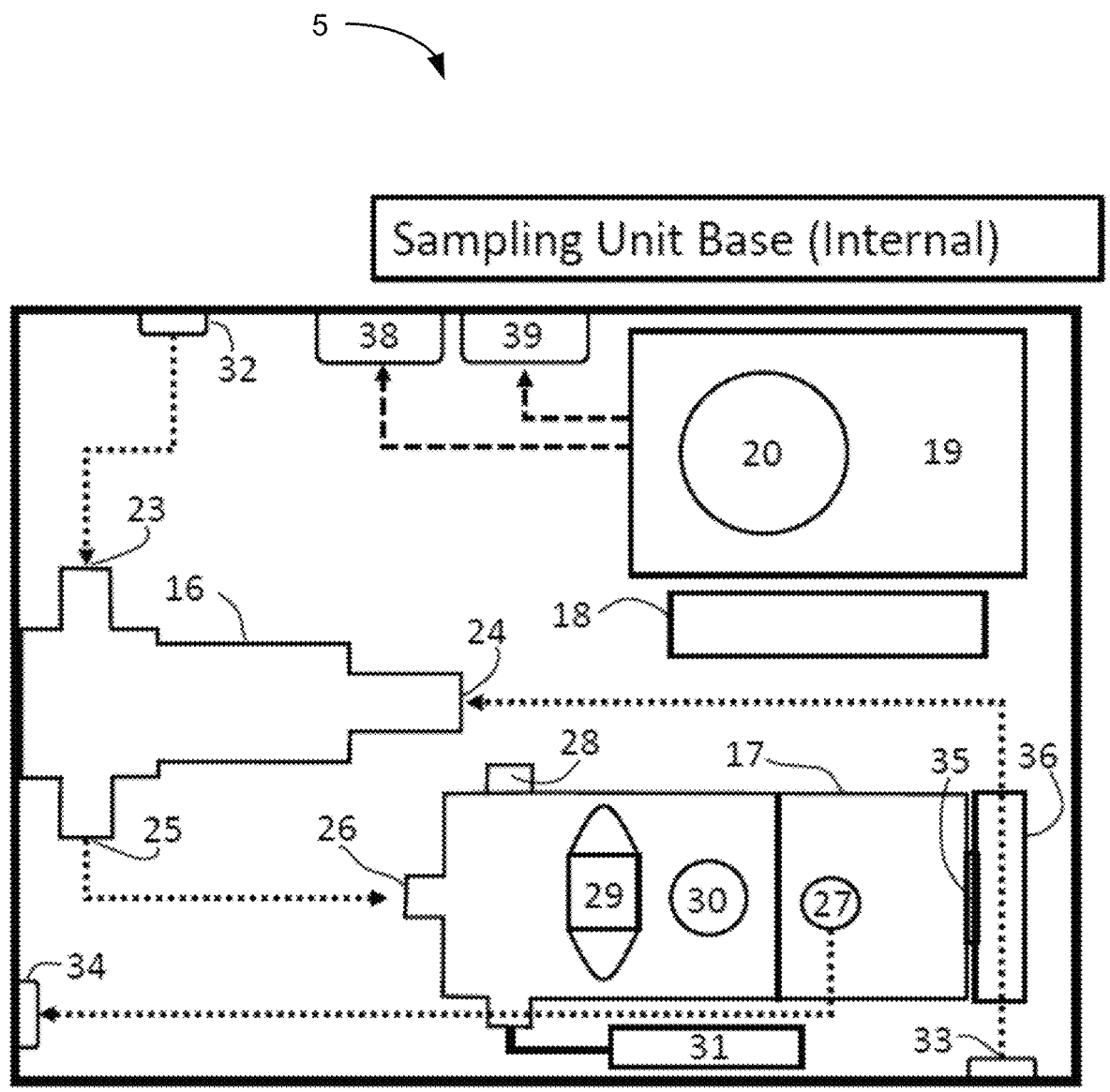
Figure 4B:
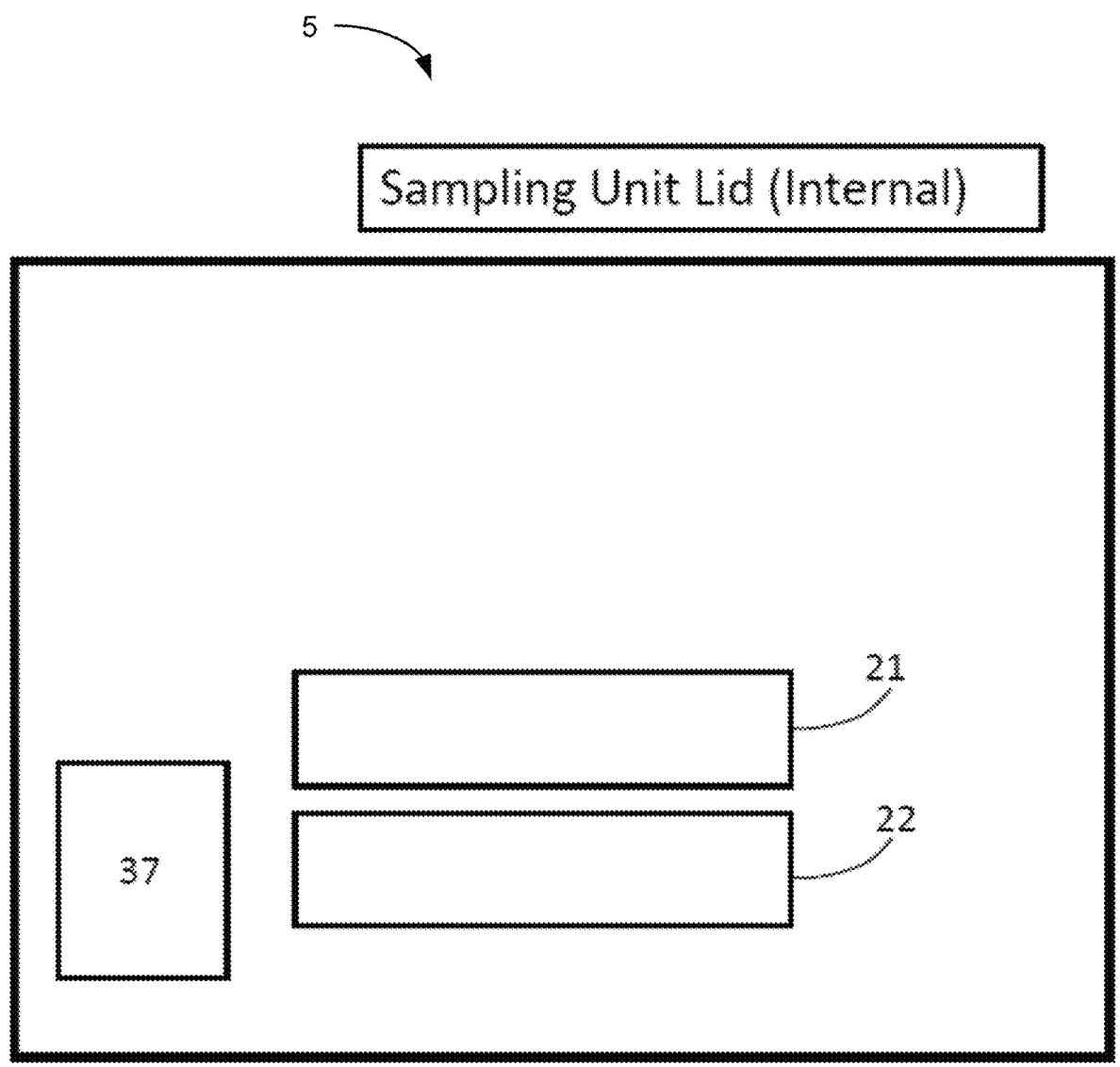

Referring now to FIGS. 4A-4B, the figures show an internal and external schematic of an exemplary sampling unit (5) in accordance with embodiments of the present disclosure. In various embodiments, the sampling unit (5) includes data acquisition capabilities to receive digital or analog sensor outputs. In addition, data acquisition systems can use "digital" analog outputs to control relays (37) or valves (16). In one embodiment, the sampling unit (5) controls a relay (37) which then controls a three-way valve (16) (or else two solenoid valves may be used). In the normally open position, the valve (16) enables sampling from the face (4) (shield tip), and in the closed position samples from the rear (gob area) (3). In various embodiments, the sampling leg includes a filtration system at the node (6). A filtration system and its components can ensure water droplets and coal dust are removed before gas enters the sampling tubes and a sensor block (17) where sensors (28-31 and 35) are installed. Choice of filtration involves a competition between the desire for low dead volume (fast response), low pressure drop (best use of eductor), and efficacy of protective filtration. In various embodiments, the valves are consolidated in a rotary valve body at the sensor block location.

Most methane sensors are passive devices that provide methane concentration at a single location, when the sample contacts the measurement elements. In accordance with embodiments of the present disclosure, an exemplary methane detection system places the methane sensors (e.g., infrared sensor 35 or MOS sensor 30) in a sensor block (17) housed within a NEMA enclosure (the sampling unit (5)) at a midspan of the longwall shield (15). A method to draw in the sample is used to transport the sample from the node (6) to the sampling unit (5) and subsequently into the sensor block (17). The sampling unit can aid in mounting and protecting the sensors.

Figure 5:
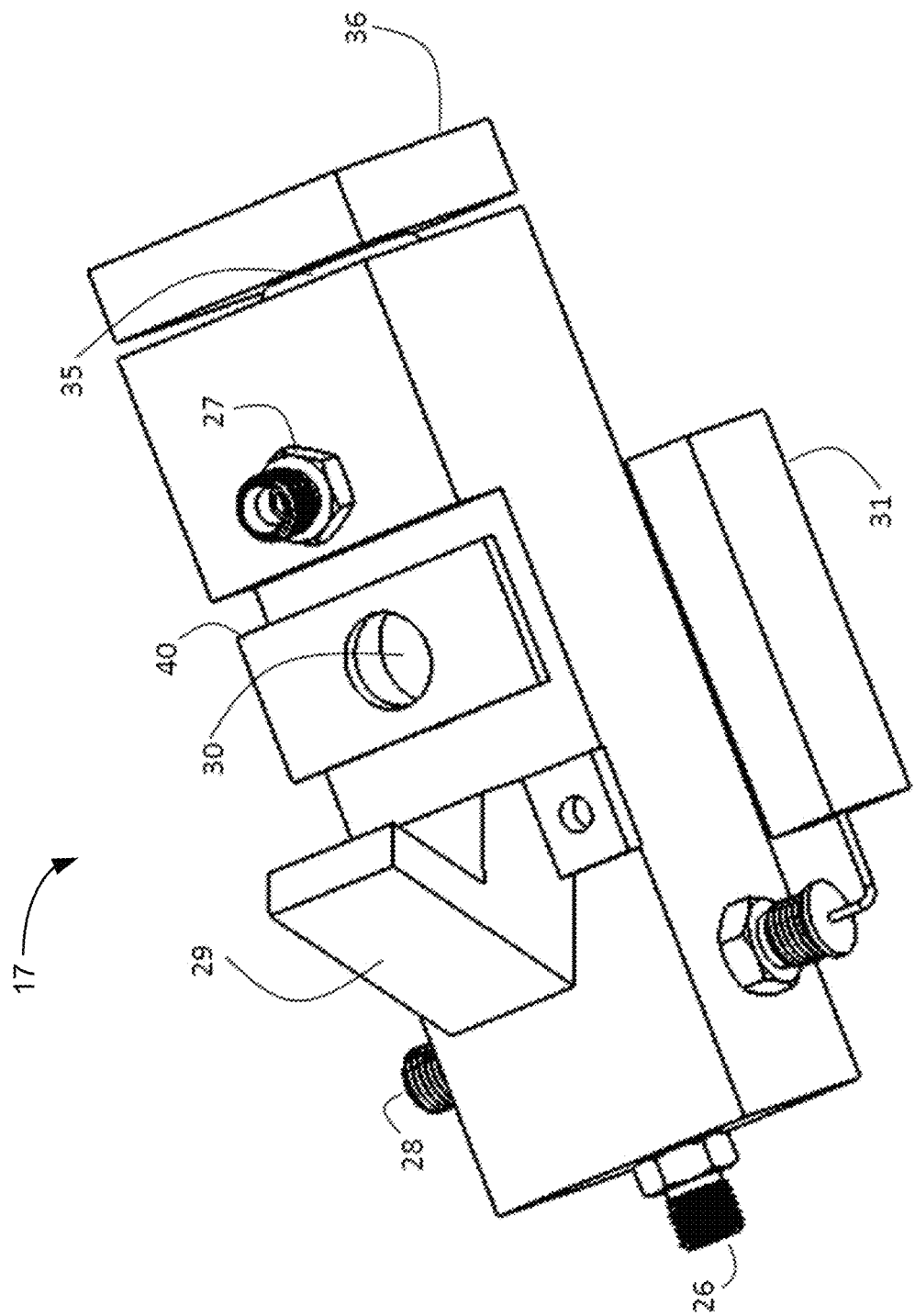
Figure 6A:
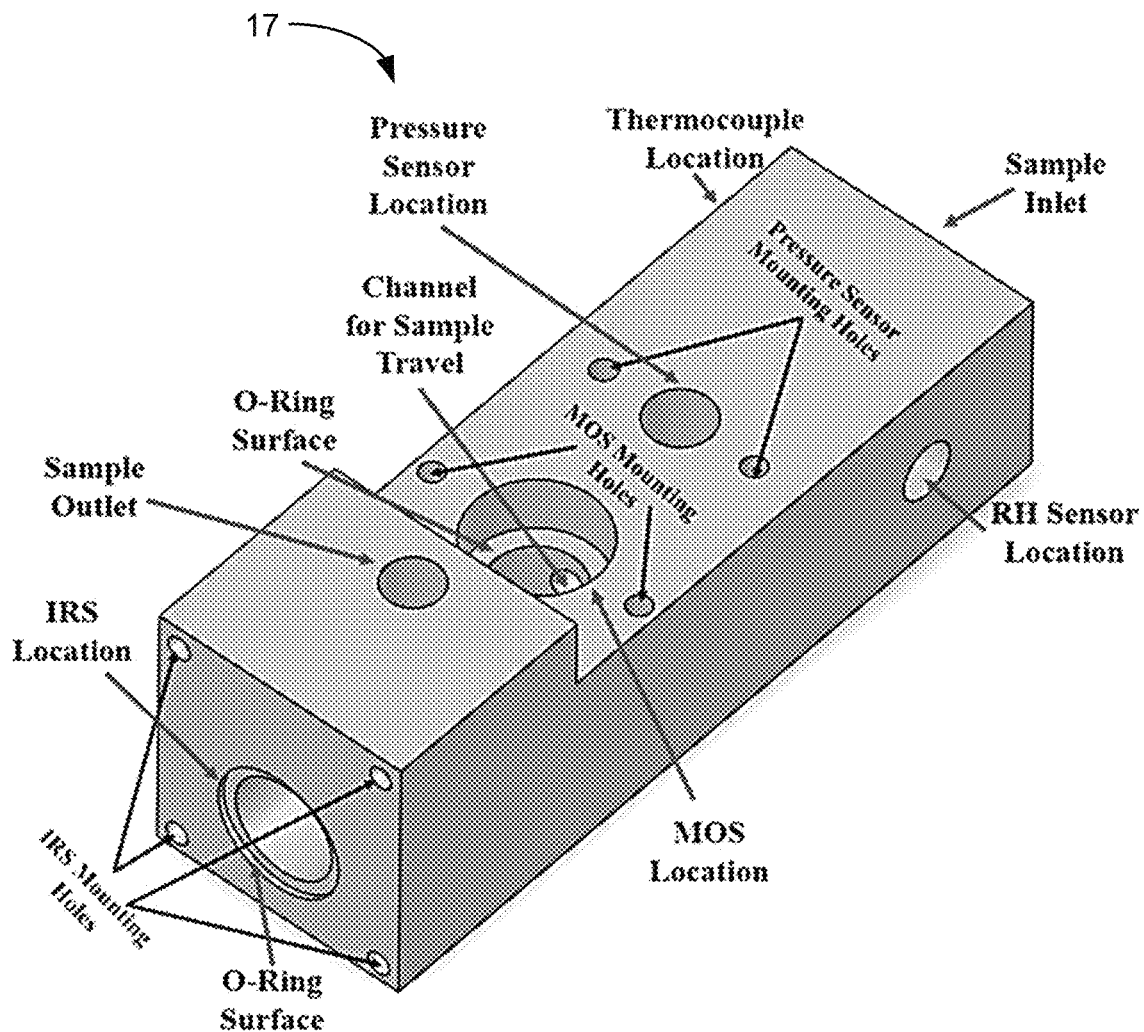
FIGS. 6A and 6B show labeled perspective and cross sectional views of an exemplary sensor block in accordance with embodiments of the present disclosure.
Figure 6B:
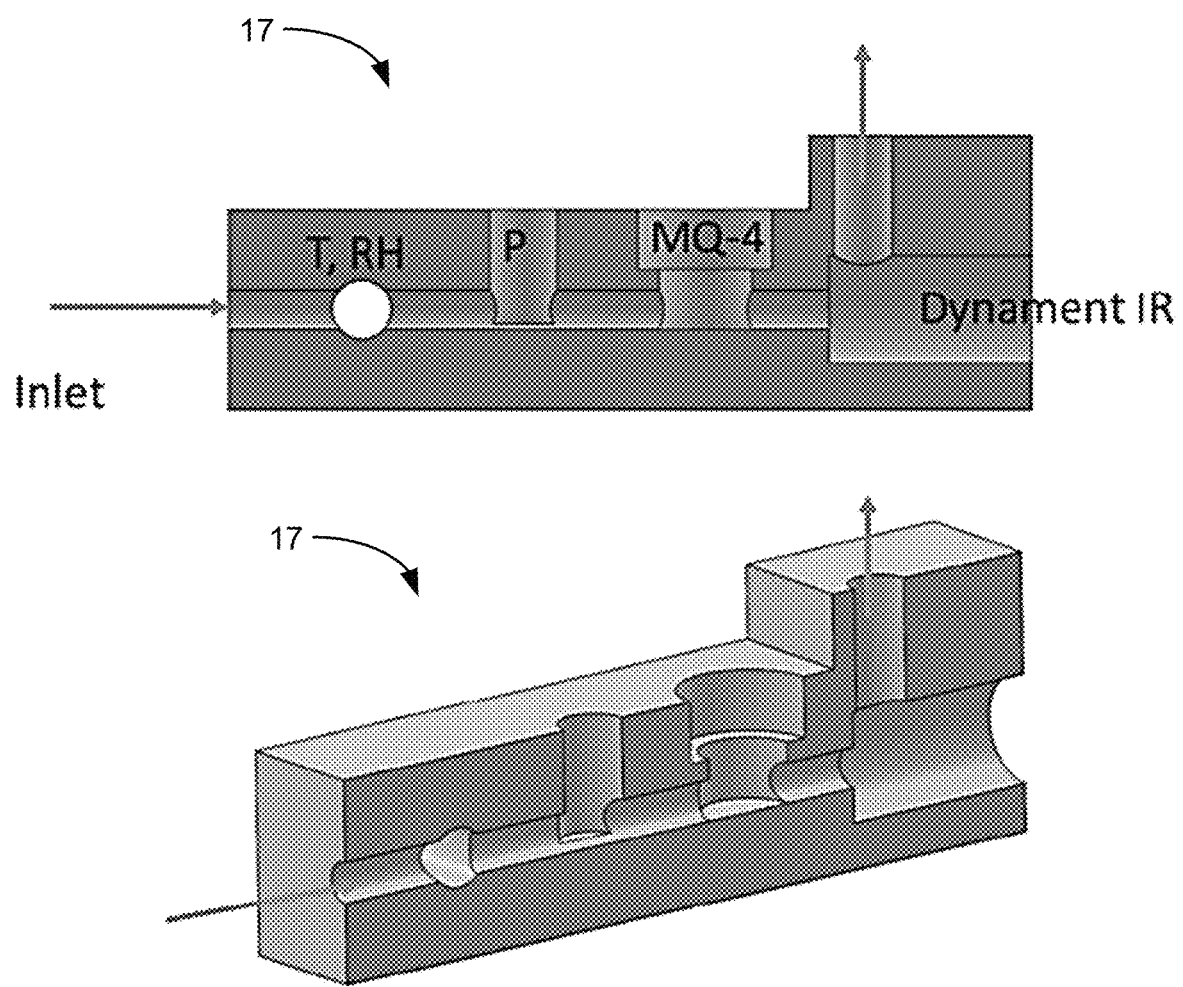

FIG. 5 is a perspective view of an example of the sensor block (17) including sensors (e.g., an RH Sensor (28); Pressure Sensor (29); Metal Oxide Sensor (MOS) (30); Thermocouple (31); and Infrared Sensor (IRS) (35)) and associated mounting plates (e.g., IRS Mounting Plate (36) and MOS Mounting Plate (40)). The sample is drawn through the sensor block (17), and past the sensors, from the sensor block inlet (26) to the sensor block outlet (27). FIG. 6A illustrates the sensor block (17) of FIG. 5A with the mounting plates, sensors and fittings removed. The sensor block (17) can be, e.g., an aluminum block machined to house the sensors. The sensor mounting locations can be milled to provide proper fit and clearance for the installed sensors. One or more of the block inlet, outlet and sensor mountings can be threaded and/or configured to allow for installation of seals (e.g., O-rings or gaskets). FIG. 6B shows labeled cross sectional views of the sensor block (17)

illustrating the flow channel between the sample inlet and sample outlet and sensor mounting locations.

Figure 7:
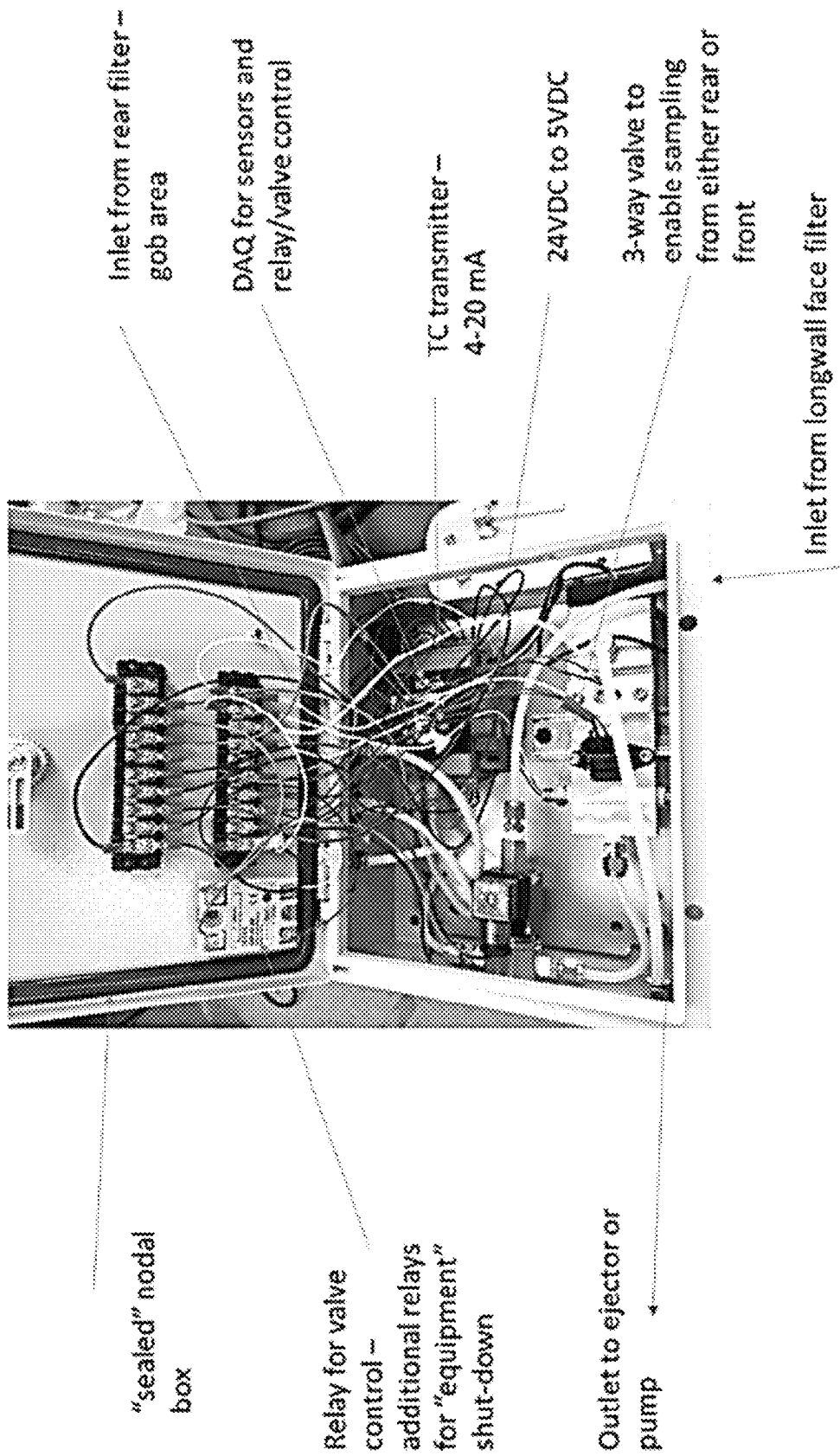
FIG. 7 shows the internal components of an exemplary sampling unit in accordance with embodiments of the present disclosure.

FIG. 7 shows the internal components of a complete sampling unit (5) with components 16-40. In one embodiment, there is a single outlet (34) is connected to an ejector/eductor. The ejector/eductor provides the motive power and negative pressure to draw samples to the sensor block (17). A three-way valve (16) is controlled by a DC/DC relay (37) and on/off output from a DAQ circuit or card. The valve is either timer based or user selectable. There are two inlets (32, 33) that can be connected to sampling tubes/lines which run to the front and rear of a roofing support system (shields/canopy).

Sample tubes draw from the sampling point (node 6) and send the sample to an enclosed sensor or sensors (28-31 and 35), so that the sampling unit 5 can be located remotely from a very hostile environment. In various embodiments, flow through the sample tube is drawn by a vacuum produced by an eductor, pump, or ejector. Several methods exist to transport the sample. In one water embodiment, the flow is drawn using water pressure as the driving energy source. The use of water for dust control, cooling, and other operations is common to mining operations. Thus, a water powered ejector/eductor can be used to induce negative pressures to enable sampling. Since the water distributed among the shield to shield network is very high (>>100 psi) and can be upwards of 400-1000 PSIG, such high pressures can significantly improve ejector/eductor design enabling a more efficient design, reduced water volume flow, or further reduction in delay time (node filter entrance to sensor body), in accordance with embodiments of the present disclosure.

Other embodiments may use ventilation air, compressed air, or other techniques to induce flow within an ejector. For example, an air powered ejector/eductor can induce a negative pressure within the sampling system. Other systems and methods could include nodal pumps or a central pump (vacuum source) and manifold system. All of these are explosion-proof methods of drawing the sample. One reason for employing the ejectors in the first place is to avoid electrical supply lines that are associated with more conventional sensor arrays. Restrictions on electrical devices in the mine are typically stringent.

Several sampling tubes drawing from different locations (nodes 6) can feed one sensor package via a sequential collector, and the sampling unit (5) may contain multiple sensors for redundant measurement, or for optimal measurement at different ranges of concentration. In various embodiments, a sample first passes inside a shielded dead volume to prevent entrainment of water droplets and large particles (in sensor node 6). The sample then passes through the filter media (in the sensor node 6) to remove fine coal dust. In one embodiment, the filters are oversized in order to ensure minimal pressure drop over continuous operation for 1 month. Filters may be augmented by a zone or bend in a flow path dedicated to sedimenting or separating larger particles ahead of the filter.

Referring to FIG. 4A, the sample continues to the three-way valve (16) and into the sensor block (17). The metal sensor block (17) is grounded to the NEMA enclosure (Note: An MSHA approved system would require additional safety such as sealed and explosion proof enclosure, check valve, etc. Electrical devices need to conform with the electrical equipment regulations. These regulations include explosion proof or intrinsically safe requirements for the enclosure and surface temperature limits.) The sample passes through the sensor block (17) and is first exposed to a thermocouple (31) (e.g., a Type-T thermocouple) and relative humidity sensor (28). These sensor outputs are connected to the DAQ channels and read by the control unit (10) which converts the analog signals to engineering units for subsequent determination of absolute humidity.

The sample is then exposed to an absolute pressure sensor (29), in one embodiment. However, a differential pressure sensor could be deployed in alternative embodiments. In either case, the pressure sensor output voltage is measured with a DAQ channel and converted to engineering units within the control unit (10). The pressure sensor (29) can be used in concentration corrections, absolute humidity calculations, and to either estimate flow rate and/or filter loading. Information from the pressure sensor can be used to determine when the filter needs to be changed; as the coal debris caked onto the filter, the absolute pressure would drop. In an exemplary embodiment, spare DAQ channels exist and could be used for additional pressure and flow sensors for monitoring flow conditions. For example, a flow sensor can be included (e.g., in the tubing connected to the sensor block outlet (27) (or inlet (26)) to monitor sampling flowrates. The flow sensor has low power requirements and provides an analog output signal for recording. In various embodiments, cost effective thermal mass flow meters for the 1-10 SLPM range can be used and placed after the sensor block (17) and prior to the eductor/ejector port (34).

In various embodiments, the sample is then exposed to a sealed methane sensor (metal oxide sensor) (MOS) (e.g., an MQ-4 sensor or others) (30). The output voltage is measured with a DAQ channel and the output voltage is converted to a concentration of methane (by volume). Data can be presented as (parts per million—ppm) or on a volume basis (% which is common in the mining industry). This conversion is a multi-step process. There are no relevant patents employing eductors or ejectors to move the methane to a sensor.

Next, the sample is exposed to an IR sensor (35) (e.g., a Dynament IR sensor or others) which also has a 0-5V analog output which is measured with a DAQ channel. The sensor data undergoes similar conversions to present methane concentration by volume. Each sensor can be calibrated individually. Depending on the primary methane sensor selected, different corrections or calibrations are used as each sensor has its own unique responses to methane, other or interference gases, temperature, pressure, and humidity. An example of the calculation is shown in Equation 1, where each independent variable is presented as a K factor for adjustment and V is the sensor output.

$$CH4\ (ppm) = V * Kcal * Ktemp * KH * K_P \qquad \text{Equation 1}$$

In various embodiments, sensors can be calibrated and test under the array of mine conditions listed in Table 1.

TABLE 1

Selected conditions for design and testing.
Mine Conditions

| | Average | Minimum | Maximum |
|---|---|---|---|
| Air Temperature (° F.) | 55-71 | 30 | 100 |
| Absolute Humidity (lb/lb) | 0.0092-0.0164 | 0.0035 | 0.0431 |
| Relative Humidity (%) | 50-90 | 20 | 100 |
| Air Velocity (ft/min) | 100-400 | 100 | 600 |
| Shearer Velocity (ft/min) | 33-98 | 0 | 98 |
| Dust loading (mg/m$^3$) | 1.5 | <1.5 | <2.0 |
| Dust diameter (μm) | 116-169 | 98 | 197 |
| Dust by size (70 Mesh) (%) | 59-77 | 53 | 83 |
| Dust by size (200 Mesh) (%) | 28-39 | 25 | 43 |

As such, there are numerous options to measure the methane or hydrocarbon concentrations at these discrete points. Some sensors and analyzers include catalytic bead sensors, metal oxide sensors (such as the MQ-4), infrared sensors (such as the Dynament IRS), flame ionization detectors, laser-based technologies, and multiple spectroscopy systems including those using Fourier Transform IR, wavelength modulation, and off-axis cavity integration. Note that some sensors such as the MQ-4 and Dynament are impacted by higher hydrocarbon species (such as propane) but methane is the predominate species encountered in mining operations. Moreover, higher hydrocarbons contribute to overall flammability too, and often are more easily ignited than methane. All of which can be deployed as methane sensors in accordance with embodiments of the present disclosure.

The MQ-4 sensor is a thermal conductivity metal oxide sensor (MOS) that uses tin dioxide ($SnO_2$) as the sensitive material. When methane is present, it reacts with the $SnO_2$ and causes the conductivity of the sensor to rise; which can be correlated to the sensors output voltage which can be used to determine the methane concentration. The sensor utilizes 24 DC power and has a low power consumption of 950 mW (lower temperatures). The sensor is capable of measuring concentrations from 0.03 to 10% methane. The MQ-4 sensor produces an analog output signal that is easily recorded. Under previous examination by researchers, the response time was on the order of a few seconds.

Infrared sensors such as, e.g., the Dynament IRS can also be used for methane detection. The IRS has similar low power requirements as the MOS and provides an analog output signal (e.g., between 0.2 and 2.4 V) that can be recorded. The MOS may be impacted by external factors such as humidity and temperature, therefore a second sensor can be implemented along with the MOS. In one embodiment, an exemplary sampling unit (5) deploys both MOS and IR methane sensors. The sampling unit (5) can also comprise a thermocouple (31) and RH sensor (28), which allow for continuous monitoring of environmental parameters that can be used for temperature and humidity corrections. Each sampling unit is capable of sampling from multiple locations (discrete nodes (6)) using an intermittent sampling strategy. An exemplary embodiment enables the sample to be drawn in from a node near the front or rear of the shields (15). Accordingly, such a system can provide methane concentration measurements from 20 locations (2 nodes (6) per sampling unit (5)).

While an exemplary methane detection system includes 10 sampling units (5), each capable of sampling from two discrete nodes (6), the number of sampling units (5) (and nodes (6)) can be expanded to suit an application. The sampling units (5) are configured to provide discrete, fast response methane concentrations (not just detection at a threshold) at multiple planes along the long wall system. The sampling units (5) can be easily integrated into new shield designs or retrofitted into current mine shields. In accordance with embodiments of the present disclosure, sampling units (5) can be either evenly distributed or placed at specific locations of interest and correlated with shield identification number.

The response times of methane detection systems are also dependent on transit times for the sample to reach the sensors. For example, if an active sampling method is used, a sample can be drawn from a sampling location away from the sensors, transporting the sample via a tube. The time it takes for the sample to travel from the sampling location to the sensor is known as the transit time. The system response time is the sum of the transit time and the response time of the sensor. It is beneficial that this transit time be small compared to the response time of the sensor for the response time of the system to be minimized.

While the delivering of a sample to a central location (e.g., control unit (10)) from multiple locations (e.g. sampling nodes (6)) has durability and simplicity benefits, it induces sampling delays and diffusion effects. These impact the overall system response and can be modified in order to ensure acceptable frequencies. A sampling delay is induced based on the sampling flow rate (induced by eductor vacuum) and the equivalent lengths of tube, filtration system, and sensor block (17). Diffusion (mixing) can occur at both the filtration system and within the sensor block (17) due to increases in cross sectional area (decreases in velocity).

To reduce sampling delay times, certain ejector or pump systems may be preferred over others. In one embodiment, the exemplary methane detection system targets a sample flowrate of 1-2 standard liters per minute through a ⅛ inch nominal diameter sampling train. This facilitates delay times of only a few seconds. Combined with diffusion and sensor response, the total system response currently varies from around 30-60 seconds which when combined with multiple nodes, can still significantly improve mine safety. Embelishments and improvements (reducing the number of sources feeding a sensor, increasing flowrate with higher eductor energy, reducing pressure loss with larger diameter tubing) can reduce the delay to a few seconds.

Longwalls can now be well over 1000 ft and if a system included only 10 nodes the resolution would be 100 ft. The velocities of shearers range from 33-98 ft per minute (0.55-1.63 ft/s). Assuming an average of 1 ft/s, such a system would still be capable of informing operators or systems ahead of entry into a high methane pocket. For this example, with a delay time of 60 seconds, the operator would still be 40 ft before the detected methane pocket. Otherwise, additional nodes could be added.

Figure 8:
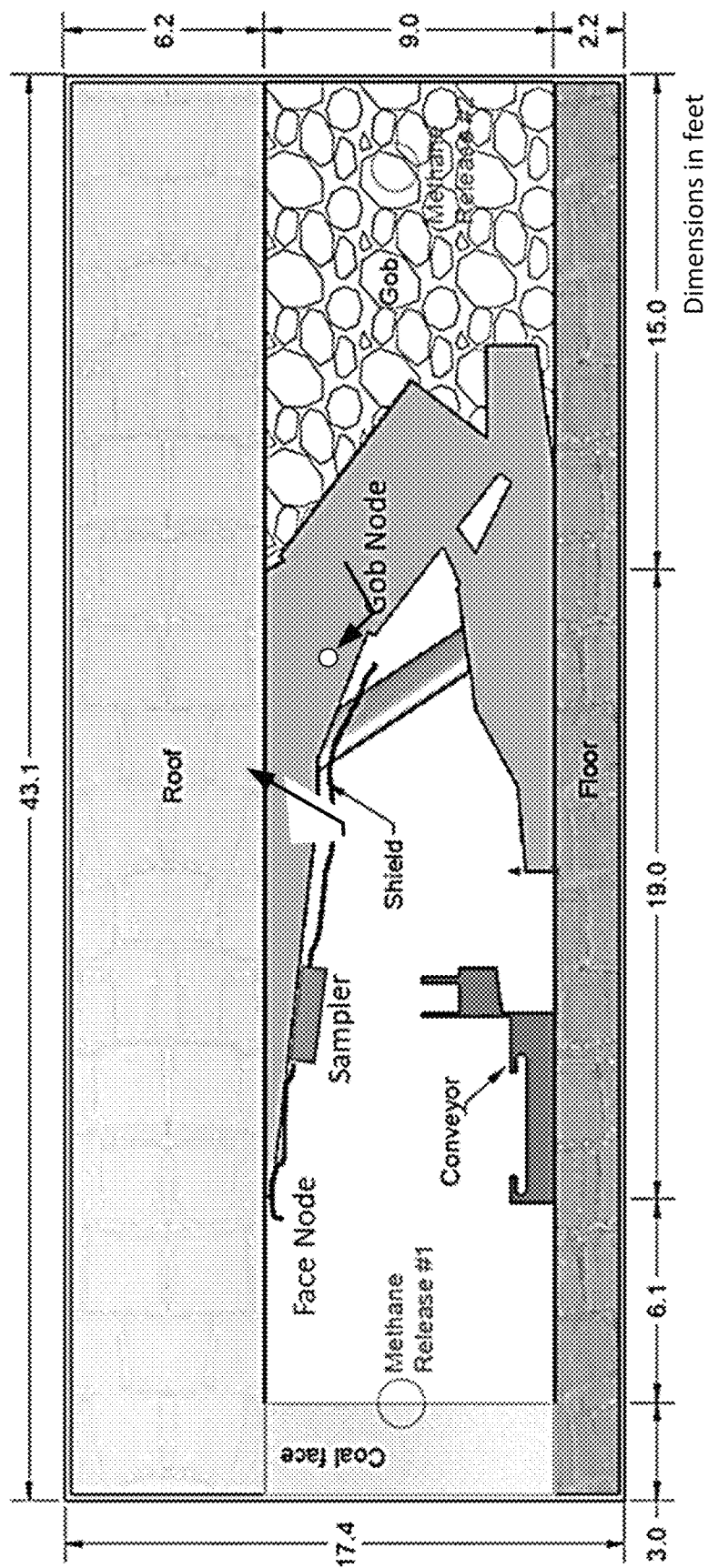
FIG. 8 shows an exemplary system design having an exemplary sampling unit centrally located in the middle of a roof support in accordance with embodiments of the present disclosure.
Figure 9:
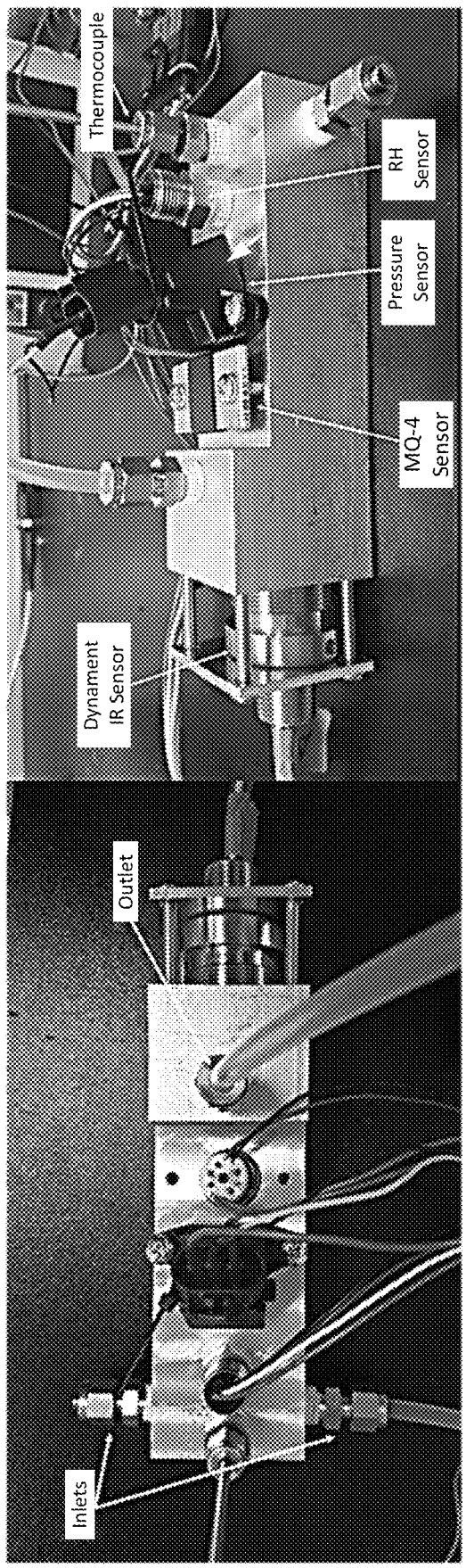
FIG. 9 shows an exemplary implementation of the sensor block of FIGS. 5-6 in accordance with embodiments of the present disclosure.

Based on laboratory experiments, an IR sensor (35) has a response time of around 10-30 seconds while the MOS sensor (30) has a response time of about 8-10 seconds. Therefore, with target sampling flow rates, an exemplary system design is centrally located in the middle of a roof support, as shown in FIG. 8, in which each sampling node (6) will be capable of sampling from either near the mine face (4) or near the gob area (3) depending on valve controls. In one embodiment, the sampling unit (5) (also referred as sampler) houses both an IR sensor (35) and an MOS sensor (30). It also includes temperature (31), pressure (29), and relative humidity sensors (28). However, an exemplary embodiment may not include all of these sensors, such as including only a single methane (30, 35) and pressure sensor (29)). The inclusion of the pressure sensor (29) can serve as an additional measurement parameter for control, so as to alert operators when a node (6) requires cleaning. FIG. 9 shows an exemplary implementation of the sensory block (17) for use with a water powered ejector/eductor. The left side of the figure shows a top view, where the inlets (33, 32) would connect to sampling tubes and filters at the face (4) or gob area (3) of the shield (15). The outlet (34) would be connected to the water powered ejector/eductor.

Figure 10:
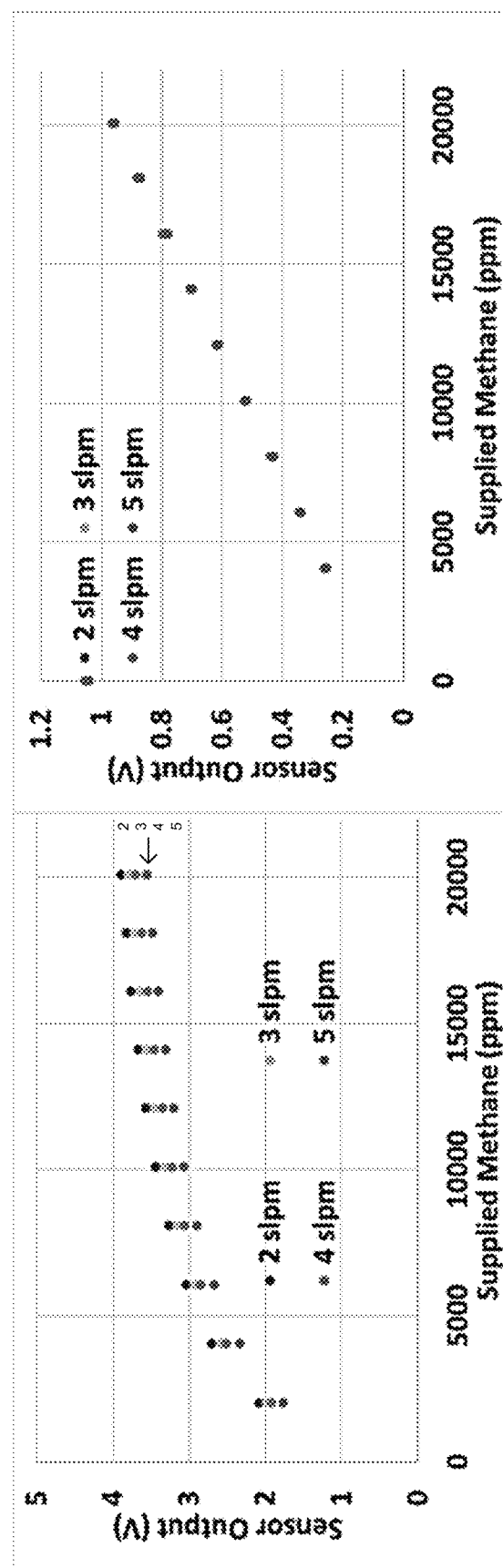
FIG. 10 shows (left) a metal oxide sensor output using a new sampler with variable concentrations of methane flow and (right) an IR sensor output using a new sampler with variable flowrates in accordance with embodiments of the present disclosure.

A consequence of the design of FIG. 9 is faster sampling velocities across the sensors themselves. FIG. 10 (left) shows that sampling flow rates from 2 to 5 SLPM do impact the MOS sensor response. However, the IR sensors do not appear to be influenced by sampling velocities under ambient test conditions, see FIG. 10 (right). Beneficial impacts of deploying IR sensors are that they are already Class 1

Division 1 approved and do not appear to be impacted by sampler flow rates or relative humidity. Beneficial impacts of the sampler design of FIG. 9 include avoidance of velocity measurements or use of compressed air—this may increase commercialization opportunities and deployment of the system. Use of water allows for integration into current plumbing systems and utilizes a resource already available in the mine; and reduces sampling delay times from 8-33 seconds to as short as 1-2 seconds or less, in some embodiments. By using sampling lines and water-driven energy, possible ignition sources are kept out of sensitive areas that potentially have high methane concentrations. Systems favoring batteries for remote power must still isolate mine gas from any potentially poor electrical contact and must address battery life and replacement issues.

Further, the application of a water-powered sampling method avoids the need for velocity measurements at each node (6) in the case of using ventilation flow as the motive power and the elimination of compressed air in the case of air powered educators/ejectors. An ejector operates using the Bernoulli Principle. Simple, single-stage ejectors comprise four main components: a nozzle, suction chamber, mixing section, and a diffuser. As the motive, or primary, pressurized fluid passes through the nozzle, its velocity increases, creating a vacuum in the suction chamber. This motive fluid can be a gas or liquid. The low-pressure region in the suction chamber causes the suction, or secondary, fluid to be pulled into the suction chamber. The secondary fluid then mixes with the primary fluid as it enters the diffuser, from which the mixture exits the ejector. In the application of using an ejector as a sampler for methane detection, the secondary fluid would be the sample.

Figure 11A:
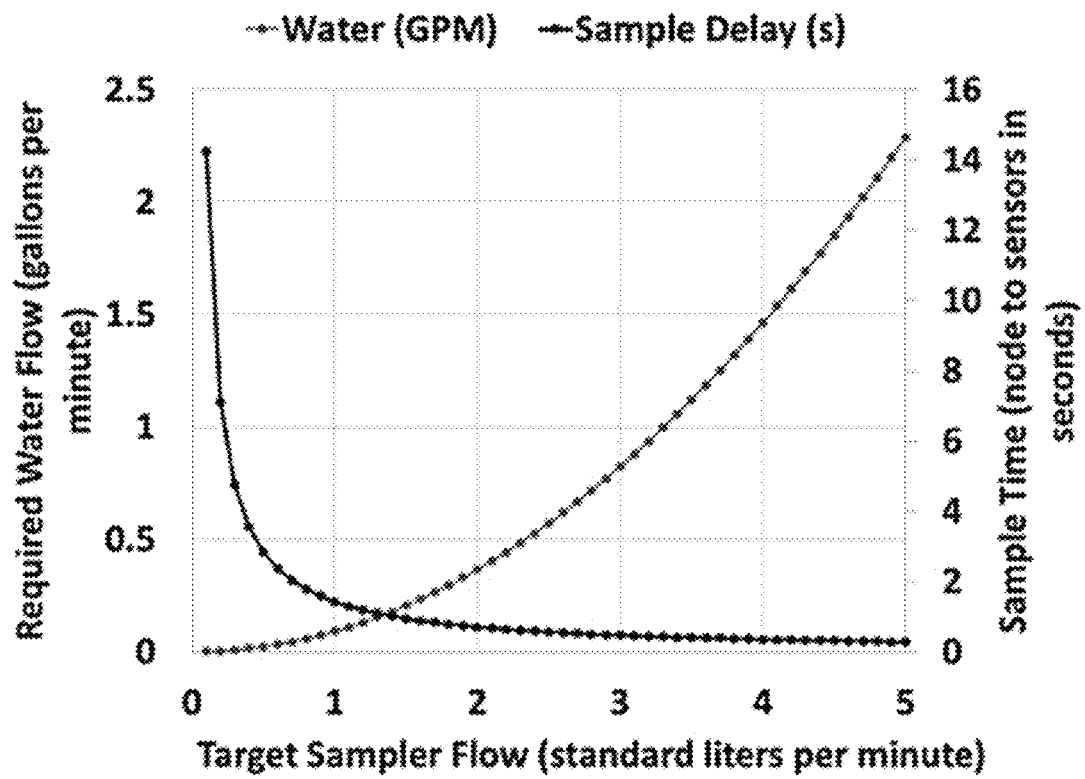
FIG. 11A shows initial design requirements for a water powered ejector in accordance with embodiments of the present disclosure.

Utilization of a water powered eductor/ejector is beneficial to the overall system and its integration. Water is readily available throughout a mine for dust control. In addition, new longwall systems have wash stations along the face where the systems could be deployed and connected to pre-existing plumbing. Initial design calculations estimate the required water flow rates at a moderate supply pressure of 44 PSI gauge. FIG. 11A shows the estimated water flow rate and sample time (from the node to the sensor block). Note that a sampler that uses ¼ inch tubing can reduce sampling delay times to well under 2 seconds with sample flow rates of greater than 1 SLPM (assuming a distance of ~10 feet based on common support system dimensions). The required water flow rates across the entire range are less than 2.5 gallons per minute.

Figure 11B:
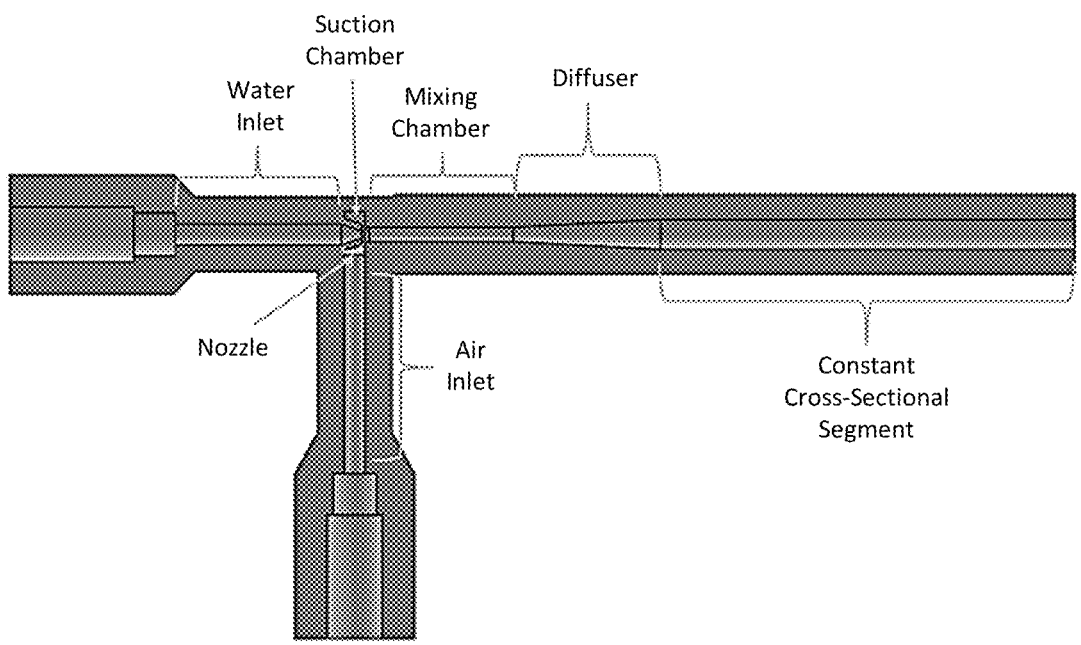
FIGS. 11B and 11C show examples of single-nozzle and multi-nozzle ejectors in accordance with embodiments of the present disclosure.
Figure 11C:
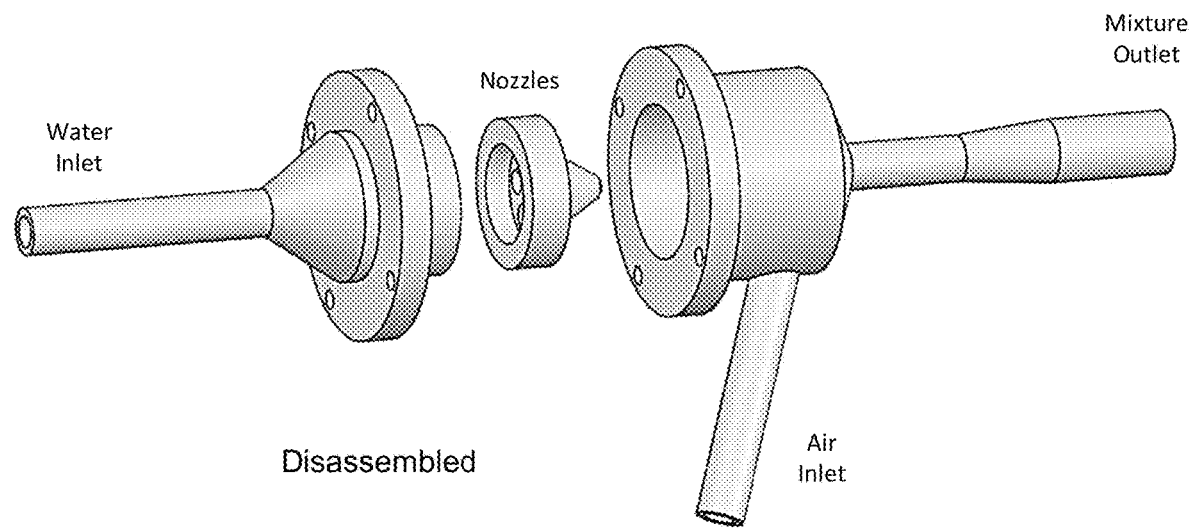
Figure 11C:
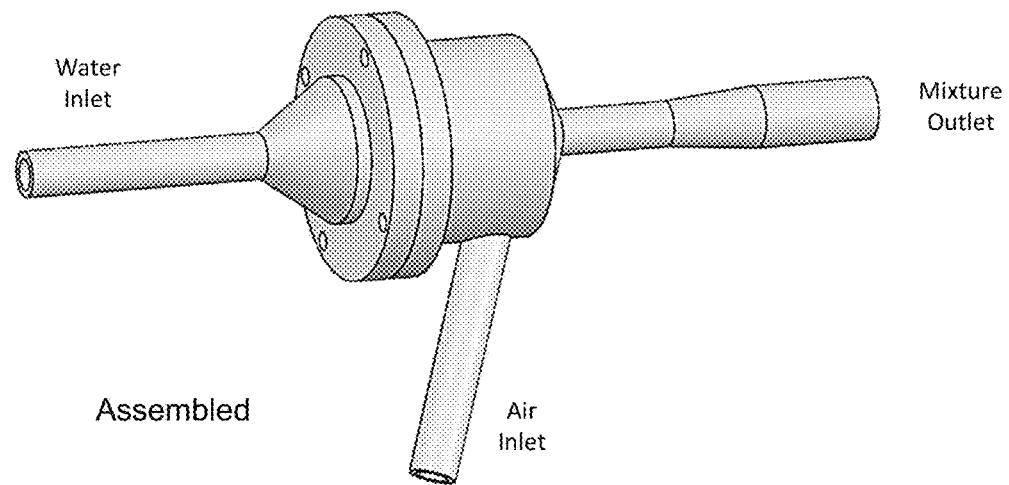

An ejector for the proposed system was designed based on use of water supply systems currently implemented in longwall mines to provide water (up to 100 psig) as the primary fluid of the ejector. The ejector can be placed downstream of a node's sampling system and the low-pressure port would serve as the motive force though the sensor block (17). The ejector was designed where the methane-air mixture is the secondary fluid; the sample fluid being pulled into the ejector to maintain an air flowrate (e.g., about 2 SLPM or 0.071 scfm). FIG. 11B shows a cross-sectional view of a fabricated single-nozzle ejector. The ejector can be designed to minimize water consumption and maximize suction pressure. Utilizing multiple nozzles can improve the contact between the motive and suction fluids, so a multi-nozzle ejector was designed to improve the ejector's performance. The new design utilized six nozzles, all the same diameter. The same nozzle area of the single nozzle design was used to calculate the nozzle diameters. The mixing chamber diameter was determined to ensure streams from all nozzles would enter the chamber without interference. FIG. 11C shows disassembled and assembled views of a multi-nozzle ejector. A throttling valve needs to be integrated with each ejector to control the suction pressure.

Alternatively, in some embodiments, an ejector may only require a source of compressed air, thereby eliminating electro-mechanical fans and moving components. Such a compressed air-based ejector can be of the pipe, orifice, or venturi type. In an exemplary implementation, the air-based ejector section may be placed upstream of a 90-degree bend that points downward to decrease the likelihood of sampling larger, heavy, and less buoyant particles. At the end of the bend would be a filter to remove lighter particles and droplets.

Figure 12:
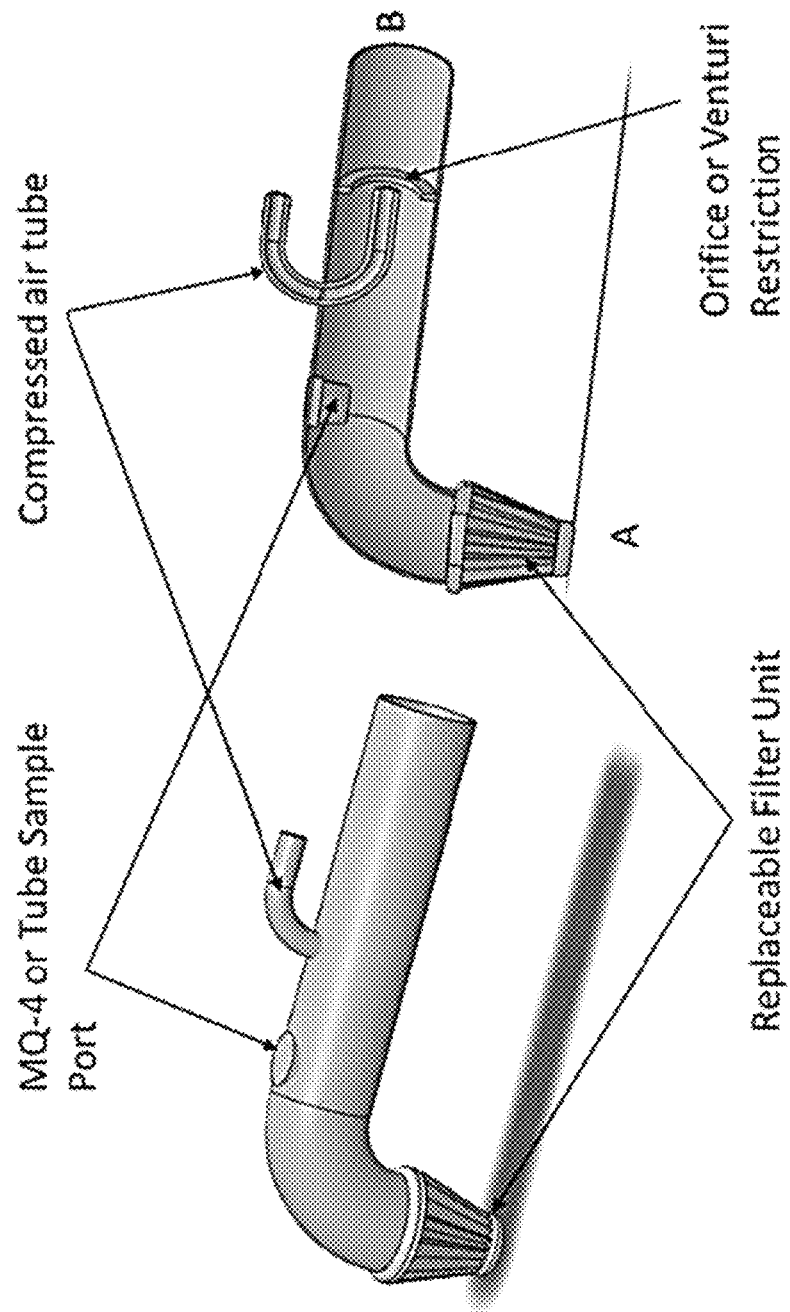
FIG. 12 shows an exemplary air-based ejector system in accordance with embodiments of the present disclosure.

FIG. 12 shows an exemplary air-based ejector system that could be used at each discrete sampling location. Ejectors use compressed air injected into a tube parallel and with the direction of flow. In this case, the sample flow enters at A and exits at B. As the compressed air exits its nozzle, it creates an area of negative pressure upstream of the venturi or orifice, which draws the methane sample through the filter at point A. For this example, an MOS sensor can be placed upstream of the compressed air entrance—to avoid dilution that would occur downstream of the ejector, thereby avoiding underestimation of the raw methane concentration. Since the unit is based on conservation of momentum, it does not require an electrically powered fan or pump.

Such a sampler would be designed for safety and would be robust to withstand the harsh mining environment. The heater power consumption of the MQ-4 is less than 950 mW. The flow rate of compressed air and flowrate of sample air within the venturi would be designed such to arrest any flame in the case of sensor failure. In addition, each system would be made of conductive metals—such as stainless steel—to ensure no static discharge and corrosion resistance.

Referring to FIG. 2, for an exemplary methane detection system, a control unit (10) is deployed which has connectivity with each of the sampling units (5), in which the sampling units (5) are distributed along the length of the longwall (4) (from the headgate (1) to the tailgate (2)). In one embodiment, the control unit (10) is a robust industrial computer which can communicate with each node (6) though ethernet cables. In various embodiments, the control unit (10) can be configured to execute go/no-go decision-making, and through its intelligence, solve the added problem of ceasing production unnecessarily.

In an exemplary embodiment, the control unit (10) is coupled to a data acquisition device that is connected to the sampling units in the field. The control unit (10) can communicate through power-over-ethernet and can be located centrally or at each node, in various embodiments. The control unit (10) is configured to receive up to 10 analog inputs from the 10 sampling units and 5 digital outputs which can be used to control the "shearer" power and sampling valves. In one embodiment, the data record rate is 1 Hz which is more than adequate given the sensor response times and the travel speed of the shearer (see Table 1). In an exemplary embodiment, a touch screen user or visualization interface is provided with the control unit for monitoring of all sampling nodes. Such a touch screen system may be housed in central location and within a NEMA approved enclosure.

In various embodiments, the control unit (1) processes the input signals with necessary calibrations and parameters may then be displayed on the user interface. The control unit (10) is capable of outputting digital signals that can be used to control the sampler (5) at each node and to de-energize mining equipment or else to activate intermittent ventilation or air handling equipment, or both. Alternately, the control unit (10) is also able to slow the mining equipment to reduce the evolution of gas, without ceasing all production. In one or more embodiments, the control unit (10) is also capable of storing historical data on internal or external solid-state devices for additional processing.

Figure 13:
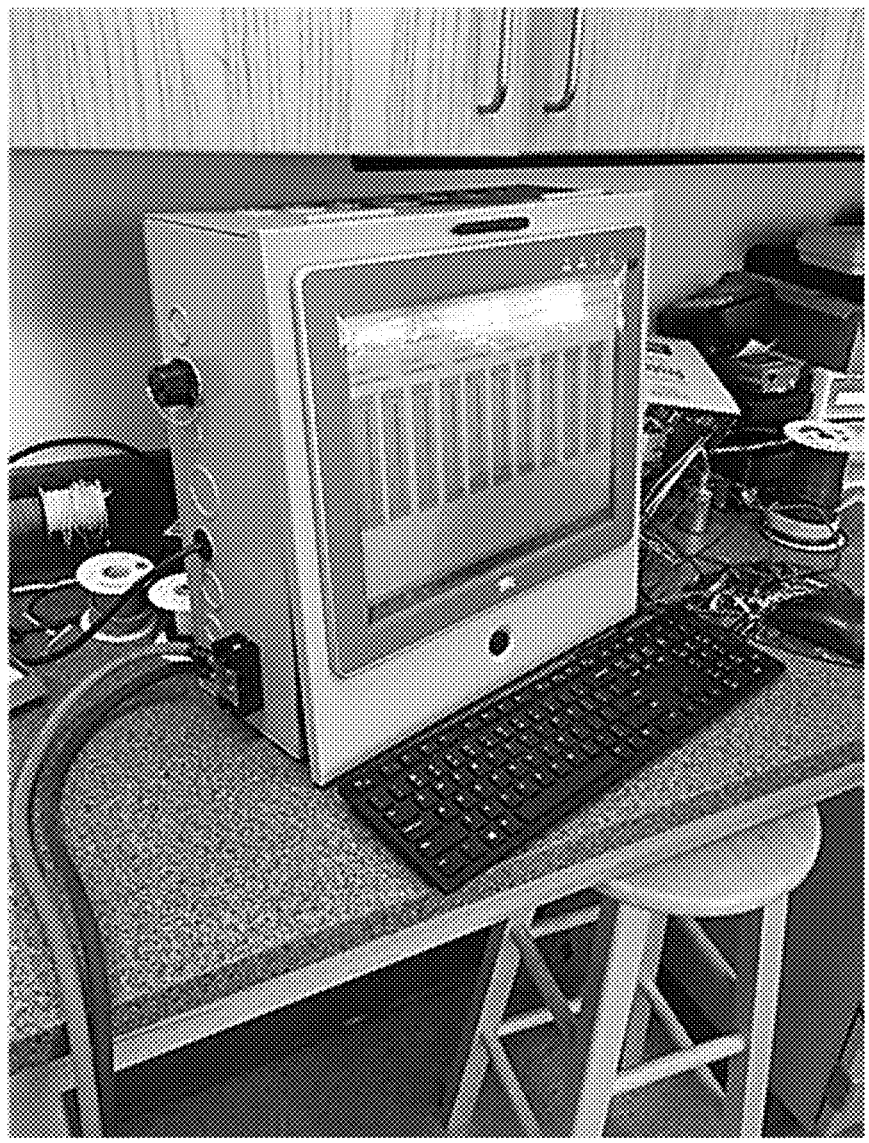
FIG. 13 shows an exemplary control unit and touch screen interface in accordance with embodiments of the present disclosure.

An exemplary control unit (10) may also be used as an energy distribution system for the sampling units (5). In one embodiment, the control unit is powered with, but not limited to, 24 VDC. For example, in some embodiments, the control unit may use 12 VDC, since current mine shields have a common 12 VDC power network. FIG. 13 shows an example of a control unit and touch screen interface. The control unit (10) can be configured to process input analog signals and display parameters on a user interface (such as methane concentration at each node) and can send and receive digital signals to control the 3-way valves in the sampling units (5) and/or alarm relays. Note that power and communication umbilical cords exit the enclosure for series distribution to the remote nodal samplers which mimic the shield to shield umbilical cords used for hydraulic fluid, water, and power. For example, the sampling units (5) can be connected in series ("daisy-chained") with ethernet cables, and the power supplied through power cables in a similar fashion. In alternative examples, the power consumption from of single nodes can be relatively low and existing MSHA approved voltage regulators and power supplies can be integrated into each shield for local power.

In accordance with the present disclosure, an embodiment of the control unit (10) is configured to measure methane concentration and/or wind velocity from a plurality of nodes along a longwall shield. Further, the control unit can be enabled to interface with the existing longwall controls scheme to de-energize the shearer when a maximum methane concentration threshold is reached. For example, control logic could use a methane concentration from any single node or an average of multiple nodes and use a digital output signal to control the low voltage isolated portion of a relay.

Figure 14:
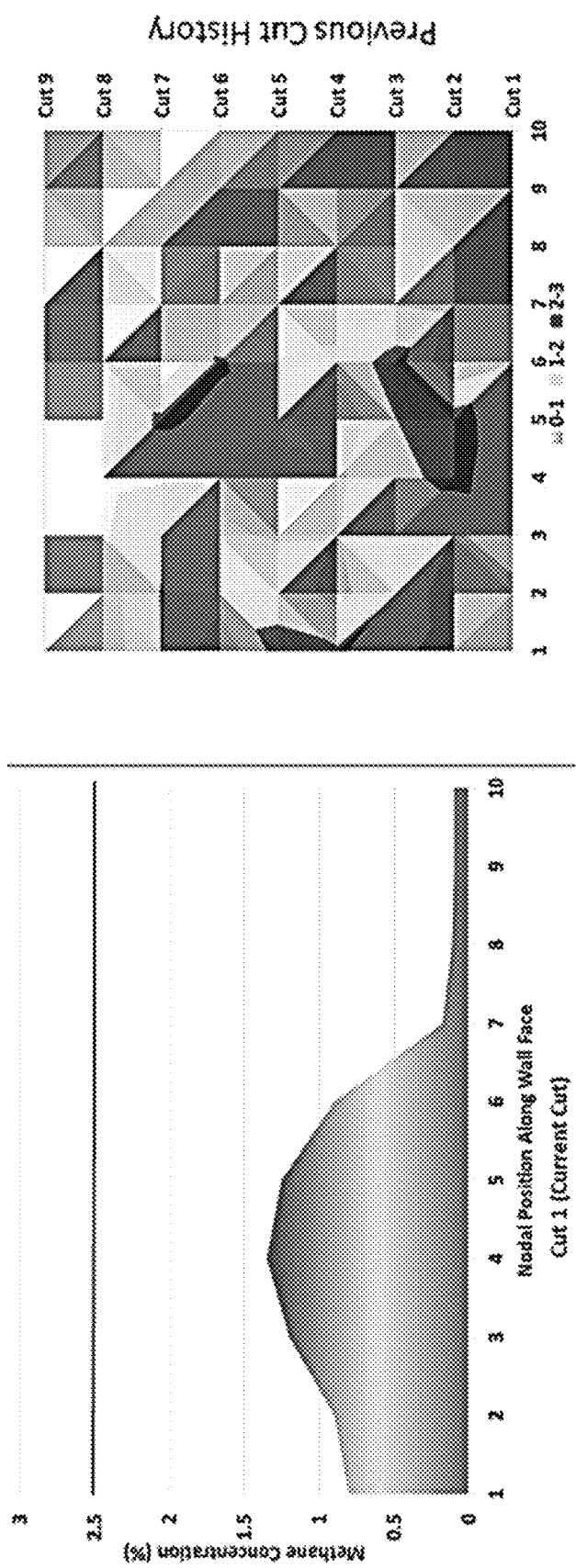
FIG. 14 shows exemplary plots for modal methane distribution having (left) a plot for reported methane across the longwall face and (right) a historical surface plot of methane in accordance with embodiments of the present disclosure.

In addition, embodiments of the control unit (10) are configured to perform logging and plotting of methane concentrations. To illustrate, FIG. 14 shows two exemplary visual plots. On the left, the control unit shows the current methane concentration profile along the coal face (4). On the right is an example of displaying the average cut concentration profile over the previous nine cuts. The data used to create the visual plots can be time stamped for correlations with cutting speed, position, or other data such as ventilation flow rate by the control unit. If other variables were nearly constant, such a method could be used to forecast when the shearer would be entering areas of the coal seam with higher methane content by the control unit. With the ability to collect historical averages per cut, the system could also predict when elevated pockets within the seam are being mined. This could be used to proactively control ventilation as opposed to relying solely on reactive control.

Multi-nodal methane measurements can be combined with shearer location and ventilation flow rates along the wall face to estimate the methane liberation rates (from coal seam ahead of the shearer) and from longwall gob. The ability to accurately collect, record, and analyze methane concentrations at multiple locations can improve mine safety to prevent the most feared hazards in underground coal mines—methane and dust explosions.

The methane concentration data measured along the full length of the longwall face can be further used to estimate gas emission characteristics from the coal face and used in a predictive fashion as experience is gained with the system and the data matrix. Based on such information, ventilation on demand (VOD) technology, popular in the hard rock mining industry, can be implemented to the longwall face for improving ventilation reliability and efficiency. Similar advanced networks can be modified and applied to other sections of longwall mines, continuous mines, and other mines where methane emissions occur, and will support automated prediction and control. With the ability to collect methane emissions from multiple locations, via an exemplary methane detection system, the VOD system can actively reduce over ventilation of the gob area while ensuring adequate flow along the face.

In various embodiments, the control unit may utilize artificial intelligence techniques such as fuzzy logic or artificial neural networks to control shearer power, shearer speed, and VOD flow rates. Data from a deployed system can also be combined with CFD (Computational Fluid Dynamics) models to optimize flowrates, controls, and ventilation design. The integration of mobile handheld units or fixed equipment sensors as mobile nodes can report to the control unit over local wireless networks (e.g., Wi-Fi, Bluetooth, Zigbee, and others), in various embodiments.

Accordingly, the functionality, speed of prediction, and predictive accuracy may all be enhanced by employing algorithms to process the sensor outputs and to yield information, set alarms or issue control instructions that are at a higher level than the raw, unprocessed concentration data. Numerous algorithms may be employed to enhance reliability of control decisions or project early warning for high concentrations.

Figure 15:
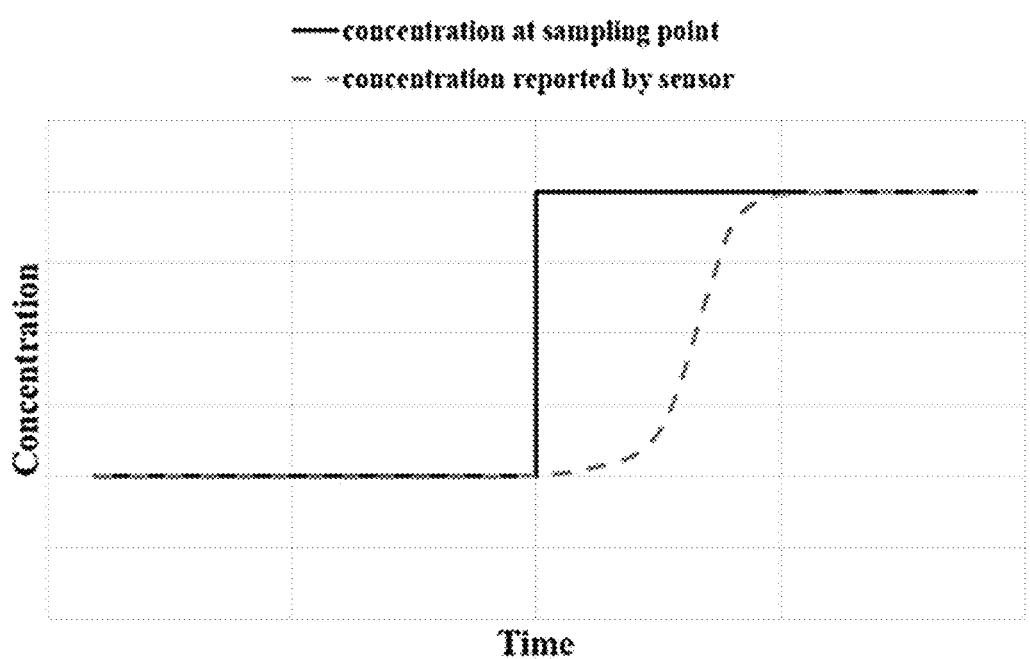
FIG. 15 shows a comparison of a concentration at a sampling point and a delayed and diffused response in reporting of the concentration by a sensor in accordance with the present disclosure.

The most basic example of an enhancement algorithm can provide a projection of the actual concentration at the sampling point, based off a sequence of measurements reported by the sensor and historical data or time histories for the sensor. There are a diffusion component and a flow delay associated with the methane traveling from the sampling point to the sensor, and a further overlaid sensor response to concentration changes. These diffusions and delays may be modeled, and then inverted, to provide a relationship or transfer function between the sampling point concentration and the reported value. Alternately, by empirical experiments, a similar transfer function may be found. For example, a step change in concentration applied at the sampling point will be revealed by a delayed and less sharp reported response. FIG. 15 illustrates an expected response to sensor delay and diffusion.

Methods exist for application to predicting continuous concentration at the sampling point based on continuous reported concentration (See Atjay, D. and Weilenmann, M., "Compensation of the exhaust gas transport dynamics for accurate instantaneous emission measurements," Environ. Sci. Technol. Vol. 38 (2004), pp. 5141-5148; Madireddy, M. R. and Clark, N. N., "Sequential Inversion Technique and Differential Coefficient Approach for Accurate Instantaneous Emission Measurement," International Journal of Engine Research, Vol. 7 (2006), pp. 437-446).

Figure 16:
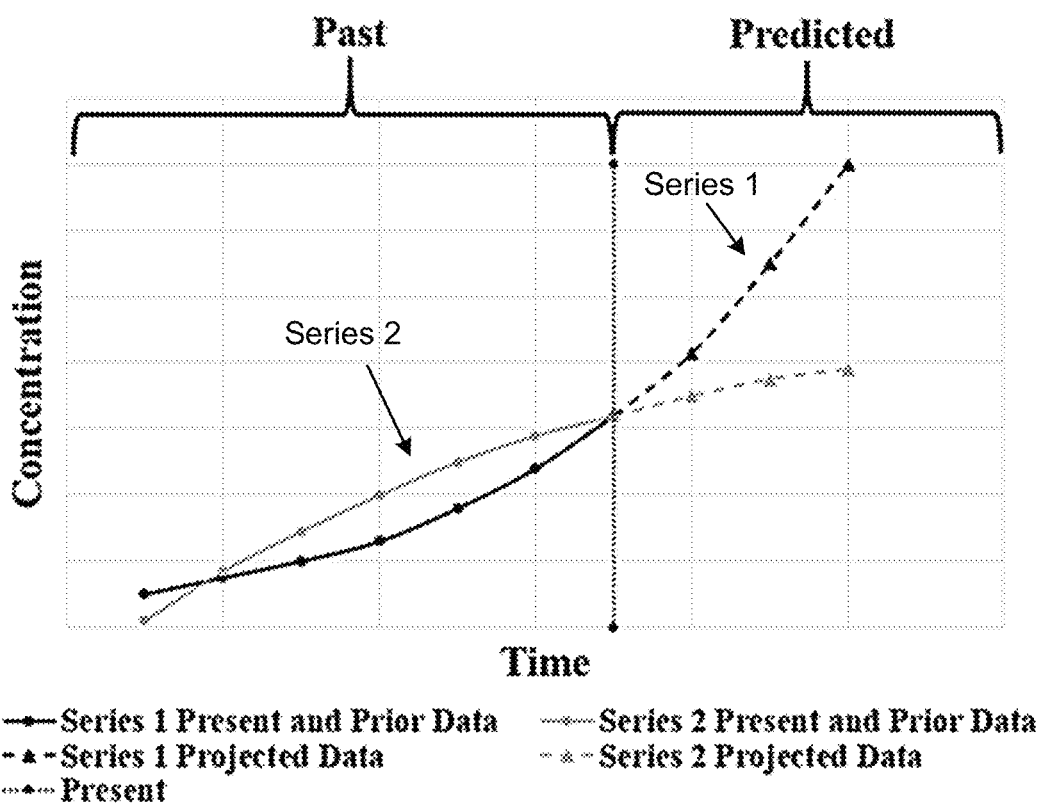
FIG. 16 shows different time concentrations for signals having a same present value and different predicted concentration values in accordance with the present disclosure.

As one example, using a single sensor signal, the concentration signal over time may be used to predict whether a future high concentration value is likely. In a specific implementation of this example, six prior values and the present value may be employed repeatedly to provide future estimation. FIG. 16 shows two different time sequences for signals, both with the same present concentration. Six prior points, in each sequence, are used with the present point to show through extrapolation that in one case a high concentration is likely, but not in the other case. Note that optimal history may be a number N of previous data points based on system learning or experimentation. This extrapolation may be performed by various methods, including modeling the sampling system and applying standard fits such as spline or polynomial fits. The prediction may be made for the reported sensor concentration, or the implied concentration value at the sampling point, the latter having higher value for safety and control. Alternately, the prediction may be made based on prior experience, by determining the most likely future concentration based on complete past histories of concentration events. This may be implemented by feeding numerous event histories to an artificial neural network and training that network to predict future values (network outputs) from past values (network inputs).

Further embellishments to increase the accuracy of prediction or anticipation of future high concentration either reported by the sensor or at the sampling point include use of information on the location of the sensor relative to an agent that causes methane release, such as the shearer. In this case, measured data would be used to educate the predictive algorithm with the sensor at different distances from, or locations relative to, the shearer, and that distance or location would be an additional input variable to the algorithm. The development of predictive capability may be automated, so that personnel are not burdened with calibration tasks.

Further examples of embellishments to the method include the use of multiple sensors to make decisions. In cases that are addressed by these embellishments, a cloud of high concentration methane may emerge near more than one sensor, or may emerge near one sensor and be moved by ventilation air to the locations of other sensors. If two or more sensors react in a similar fashion, there is greater confidence in concluding that there is a high concentration of methane, and the cloud of methane will be larger and offer greater risk. If a cloud is observed at one sensor, and then seen at other sensors downstream, confidence is also greater, and it can be seen whether the cloud is diffusing and being reduced in overall concentration, or not. It is likely that these events will be repeated during numerous shifts in the mine. Therefore, control may include both temporal and spatial derivatives.

With a different approach, an algorithm can be configured to use an anticipated methane source, such as the material being mined by the shearer, as the reference position. A hypothesis that a methane cloud is forming can be tested by examining the signals from the sensors that would sample from this cloud area, where the cloud area may detach from an intermittent source and be swept with the mine ventilation flow, or where the cloud may actually form a plume if high methane production is sustained for a longer interval.

Figure 17:
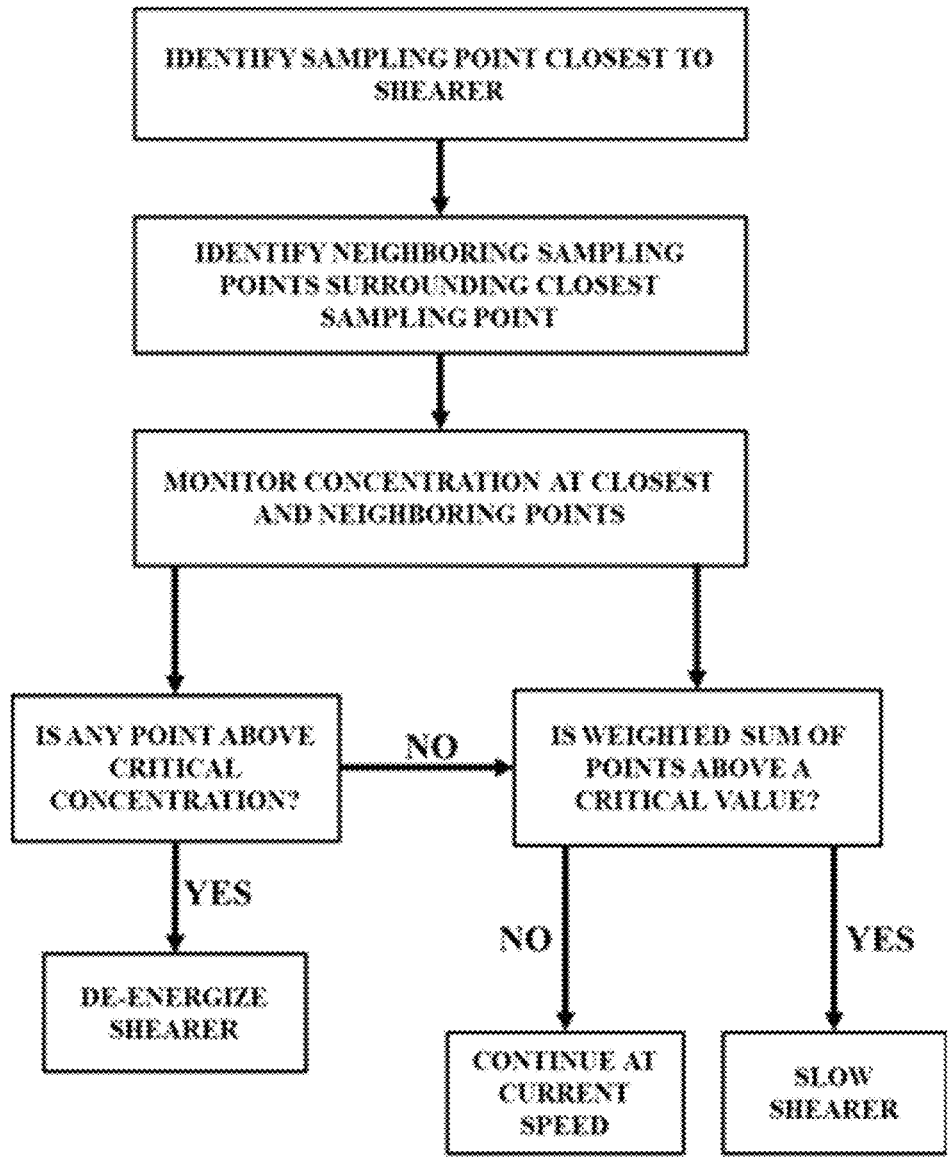
FIG. 17 is a flowchart diagram of controlling a speed of shearers on a coal mining machine based on monitored concentration levels in accordance with various embodiments of the present disclosure.

FIG. 17 shows an example of a flowchart by which mining operations (by a coal mining machine, such as a longwall machine, among others) is stopped, continued at a reduced rate, or continued at the present rate based on sensor concentrations and a weighted sum of sensor concentrations that indicate the size and concentration of a plume or cloud of diluted methane. In the figure, the method identifies a sampling point closest to the shearer, identifies neighboring sampling points surrounding a closest sampling point, and monitoring the concentration at the closest and neighboring sampling points. If there is any point above a critical concentration threshold, then the shearer is de-energized. Otherwise, if there are no points above the critical concentration threshold, a weighted sum of the closest and neighboring sampling points is calculated and evaluated against a critical value threshold. If the weighted sum is not above the critical value threshold, the shearer is maintained at its current speed. Otherwise, if the weighted sum is above the critical value threshold, the speed of the shearer is reduced or slowed down.

More detailed algorithms may be developed by monitoring prior concentration data from sensor arrays online, by identifying the concentration maps or contours that preceded a high methane concentration instance that led to work stoppage, and determining methods to identify those maps or contours of interest and slow the cutter speed ahead of an anticipated high concentration. Similar algorithms may be developed to identify patterns associated with high methane loss from gob.

Thus, functionalities or characteristics of certain embodiments of the control unit and/or methane detection system include the following: Enable continuous monitoring of methane concentrations; Alert (visually/audibly) when methane exceeds 1.0% (1.5% for disconnection); Control relays to disable equipment, disconnect/isolate high voltage, operate fans or ventilators, sound alarms; Enable remote monitoring of concentrations up to 1-5% for continued data collection after a methane event; Only a single moving part per unit (if dual sampling points are used—else none); Includes anemometers to monitor ventilation air velocity at multiple points—continuously; Estimate methane liberation rates and their trends for accurate prediction and modeling support; Advanced model based control could be used in addition to the "digital" on/off at 1.0 and 1.5%; Records historical data on methane liberation rate, methane concentration and mine conditions (that may be used by industry for design, used by regulators for guidance, and used by researchers); Solid state main and backup drives; Ability to communicate with other equipment, sensors, devices, controllers, recorders, data loggers, etc.; and likely to develop into obligatory equipment through government rules or industry expectation.

As mentioned above, in various embodiments, the methane detection system also includes the capabilities of at least two mine air flow measurement devices—such devices could include low-power ultrasonic anemometers placed near the headgate and tailgate. An anemometer can also be included at one or more sampling unit (5) to measure air velocity. For example, a 3-cup anemometer with low power requirements can be mounted on the sampling unit (5). Since foremen are required to make periodic air velocity measurements at the face, including these capabilities could supplement current practice. For example, these data could be cross-examined with total ventilation to determine the effectiveness of delivered flowrate to the targeted area of the face. Knowing the average velocity at the entrance and exit of the face could be used alone with methane concentration data to elucidate the rate of methane liberation and flow rate along the face. Such methods are similar to those used to estimate methane mass emissions or fluxes from ground level processes. Since methane is lighter than air, and may rise to have a high concentration beneath a surface, the sensors would be placed directly under the canopy of the longwall shield. This location could also include the flowrate measurement device to ensure that the methane concentration and velocity are monitored in the methane boundary layer. Even if methane concentrations are low, the system could detect if the air velocity is lower than the recommended 100 ft/min at the roof to prevent layering. (See Bakke P, Leach S J, "Principles of formation and dispersion of methane roof layers and some remedial measures," Min Eng (U.K.) (July, 1962), pp. 645-669). By using intelligent signal processing, the control unit may determine when a sensor is starting to clog through elevated response times and slow concentration changes with respect to time relative to neighboring sensors and issue an alert or alarm indicating that a filter needs to be replaced.

Embodiments of a methane detection system and method in accordance with the present disclosure can overcome the current limitations of methane detection along the wall face that include: 1) use of a single sensor at the shearer; 2) the shearer and sensor already being in a possible methane plume (no future predicative ability); and 3) inability to measure methane after mining (gob area or historical data). A sensor network of the present disclosure can provide discrete measurements to present a methane concentration profile along the face, in which valuable data can be provided at locations before and after the shearer as opposed to concentration at the shearer alone.

In certain embodiments, the methane detection system can be deployed in a variety of industrial situations where an ignition or hazard source (e.g., poisonous gas) either potentially exists or is measured to exist at that point in time. As an example, the methane detection system could be configured to exclude mobile equipment such as forklifts from certain areas if those areas have elevated flammable gases present.

Testing and validation of the methane detection system was carried out at a mock mine setup in a wind tunnel. To represent the dimensions of a typical longwall mine, the wind tunnel was sectioned by placing a 30.5 by 6.1 m (100 by 20 ft) piece of plastic 2.4 m (8 ft) from the ground to act as the roof of the mine. The height of the roof was determined based on the maximum and minimum height of a shield, fully extended and fully collapsed, respectively. A mock mine roof height of 2.4 m (8 ft) was used with the plastic laid across ten "T" structures. The cross-sectional area of the mock mine was approximately 4.9 by 2.4 m (16 by 8 ft), making the experimental volume approximately 373.8 m3 (13,200 ft3). The prototype methane detection system was installed in the mock mine. Ten sampling units were evenly spaced along the 30.5 m (100 ft) wind tunnel (one at each node and mounted near the roof, 2.4 (8 ft) from the ground, at the center of the cross section. Node 1 was located nearest the headgate (HG), adjacent to the control unit (CPH), and Node 10 was located nearest the tailgate (TG). Each node had the ability to sample from both the face and gob sides (not simultaneously) 2.1 (7 ft) from each side of the node, perpendicular to the flow. Two fans (one at the HG and one at the TG) were included to assist ventilation flow through the mock mine. Measurements of airflow were carried out using anemometers. Due to the lack of water access at the mock site, two positive displacement diaphragm pumps were used in conjunction with two manifolds to induce sample flows through the ejectors. Each pump controlled the flow through five sampling units.

To attain measurements of ambient conditions, baseline tests were completed without the presence of methane for the measurement of temperature, RH, and pressure in the mock mine. The tests were recorded overnight or over the period of 2-3 days. Temperature, RH, and pressure were measured in each of the ten sampling units as well as by an Omega iBTHX (a referenced, calibrated device) located on the face side at the middle of the mock mine (at the door) near the roof. Tests that involved the presence of methane were recorded for a period sufficiently long to obtain baseline conditions before the methane was introduced.

Two methods were used to analyze system response times when exposed to methane. The rise and decay times of the system were found for each test using both the metal-oxide sensor (MOS) and infrared sensor (IRS) responses as reference. During these tests, methane at a known concentration of 2.03% (from a calibration gas bottle) was supplied to the desired sampling location(s). Method 1 supplied methane to five sampling locations at a time through a tubing network, while Method 2 examined a single sampling location.

Method 1. The recording of the test was started before the supply of methane was initiated to record background conditions before supplying the methane. The methane was then supplied to each sampling location at a flowrate lower than the sampling flowrates of each box to alleviate the chance of effecting the response time due to the methane supply rate; the remaining portion of the sample was pulled from ambient. The flowrate of the methane was regulated by a mass flow controller (MFC) that was connected directly to a pressure regulator on the methane gas bottle. The time in which the methane supply was initiated (start time, $t_{start}$) and the time at which the methane supply was ceased (stop time, $t_{stop}$) were either controlled and referenced by the MFC or by the 3-way valve system. The rise and decay times of the system were determined based on the responses of both the MOS and IRS. The rise time was characterized as the time it took a sensor (MOS or IRS) to reach 90% of its total steady response once the methane supply was initiated ($t_{start}$).

Figures 18A, 18B, 18C:
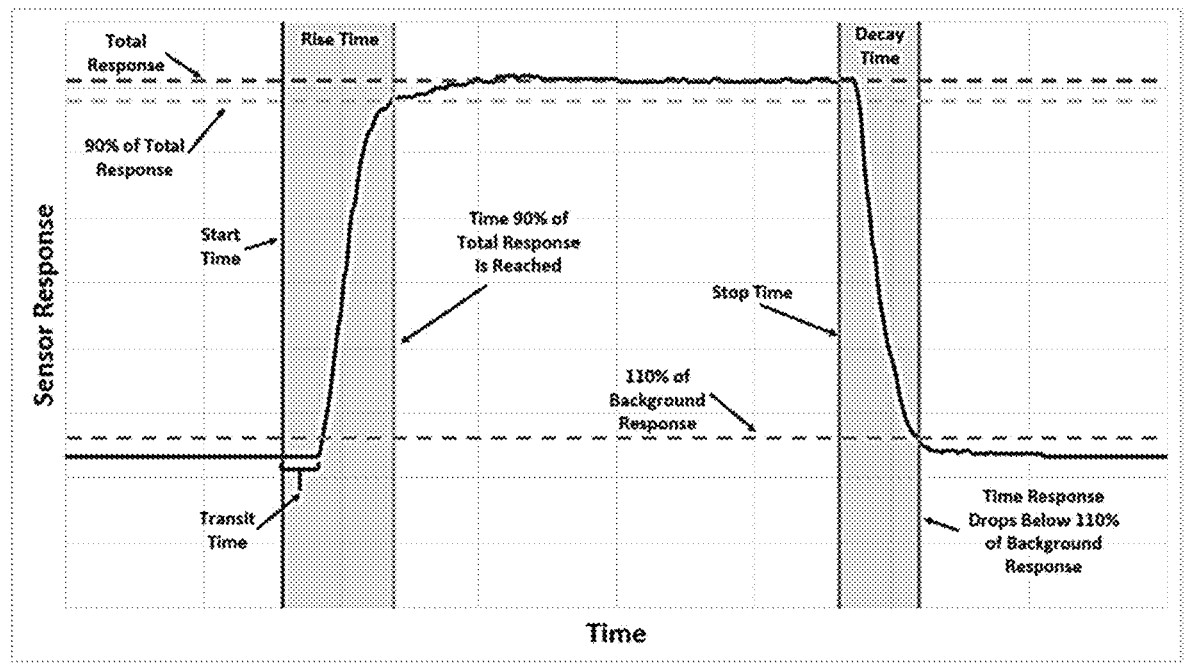
FIGS. 18A-18G show examples of various testing results of a methane detection system in accordance with various embodiments of the present disclosure.

FIG. 18A illustrates an example of a sensor response showing the rise and decay times. The total response was determined by taking an average (60-100 seconds) of the peak sensor response while methane was supplied. The total response was then multiplied by 0.9 to determine 90% of the total response. The decay time was characterized as the time, once the methane supply is stopped ($t_{stop}$), to drop within +10% of the background response; the background response was determined by averaging (60-100 seconds) a "flat" segment of the sensors response where no methane was being supplied. The flat response after the start time and before the response begins to rise was the transit time associated with the sample travelling from the filter to the sensors. After the rise and decay times for each test were found, the results for both the MOS and IRS were averaged to calculate an average rise time and an average decay time for each sensor.

Method 2. This was performed where the MFC was placed directly at the filter of sampling location 5. A tube was attached to the MFC and inserted into the filter. This method was repeated four times with four different methane supply flowrates: 3, 1.4, 1.3, and 1.2 SLPM (0.106, 0.049, 0.046, and 0.042 scfm). A similar method of averaging (as for Method 1) was used to calculate the rise and decay times.

Figure 18D:
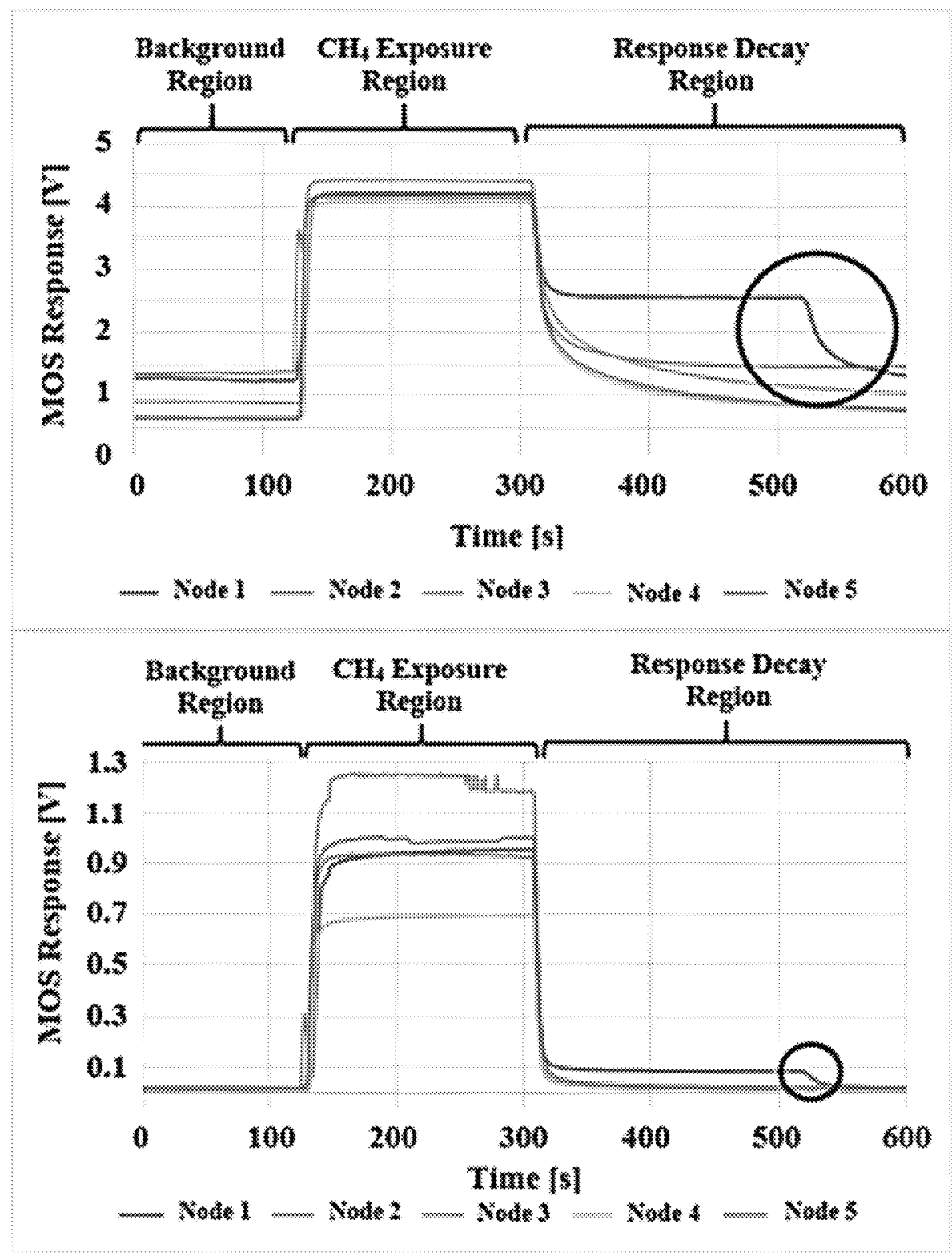

The four tests performed using Method 2 supplied the methane sample to the filter at four different flowrates. No distinct correlation of supply flowrate to the response times was indicated. The table of FIG. 18B shows the resulting response times for the MOS and IRS of node 5. Since there did not seem to be a correlation between the supply flowrates used and the response times, the results from the four tests which used Method 2 were also used to compare to the results of Method 1. The table of FIG. 18C presents the averages of the rise and decay times for both the MOS and IRS of the four tests using Method 1 as well as for the four tests using Method 2. Since Method 2 occurred on a nodal basis, only averages for the face sampling location 5 are presented to allow for comparison of the two methods. FIG. 18D shows an example to help visualize the effect and includes the raw response as well as the calibrated response as a methane concentration in percent by volume.

FIG. 18D shows that the response of the MOS at sampling location 1 did not fall back down to the background response after being exposed to the methane supply as the other four appeared to; it seemed to get "hung-up" at a methane concentration of around 0.09% for approximately 200 seconds after the other sensor responses dropped close to the background concentration (see the circles in each plot of FIG. 18D). This may be attributed to the majority of the methane diffusing from the supply tube was being pulled/sampled by box 1 (the box associated with sampling location 1). Results in The table of 18C shows that the rise times for Method 1 were greater than those of Method 2 for both the MOS and IRS, however the response times of Method 2 were aligned with those of current sensors used in mining applications as presented in literature. The greater rise times for Method 1 may be attributed to the diffusion or leaking of the methane concentrated gas from the methane supply tubing that led to each sampling location. The diffusion of the methane concentrated gas from the tube after the supply was turned off, in Method 1, may also be the reason the decay time for the MOS being higher for Method 1 than for Method 2.

Tests were also performed using a full flow sampling system (FFS) operated in reverse to deliver dilute methane plumes directly near the filter inlet at the sampling location as well as to increase the concentration of methane and its flowrate. The system utilized a blower that coupled a dilute flow measurement section containing a mass air flow (MAF) sensor, temperature sensor, and a calibrated, highly accurate laser-based methane sensor used for varying methane emissions into the mock mine. For type 1 testing (Constant Immobilized Leak with Low Ventilation), only the fan located at the TG of the test section was on to help direct and pull flow through the wind tunnel. The FFS was then placed at the HG with its flow directed down the test section, parallel to the face of the longwall. The release point was fixed in position before Node 1 at a fixed height from the ground. For type 2 testing (Constant Immobilized Leak with Increased Ventilation), another fan was added at the HG. For type 3 testing (Methane Released Directly Near the Sampling Locations), the FFS was placed directly near each individual filter at the sampling location to ensure the desired concentration was present. For type 4 testing (Methane Released Directly Near the Sampling Locations and Continuously Moving), the FFS placed about 0.3 m (1 ft) away from and continuously moved past each sampling location at a slow walking speed.

Figures 18E, 18F:
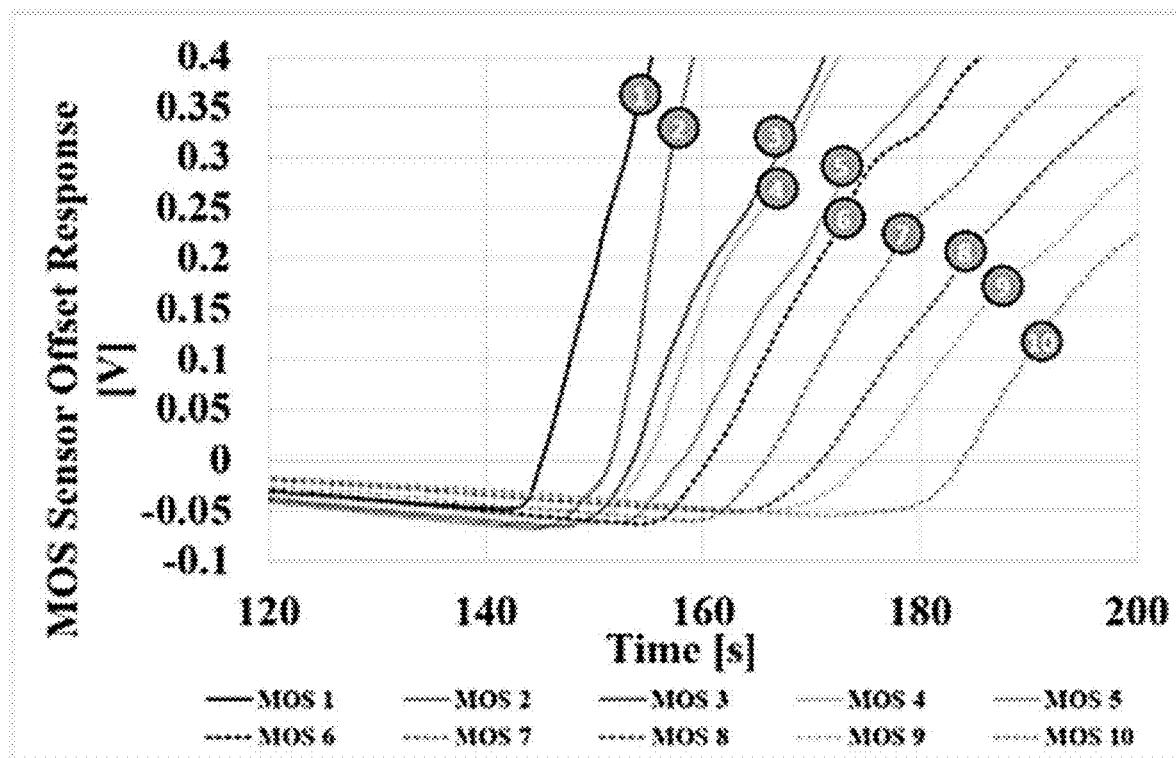

For type 1 and type 2 tests, a methane concentration of approximately 2% was leaked at a rate of 2832 SLPM (100 scfm). The metal oxide sensor (MOS) responses for the Type 2 (two fans) tests were noticeably "smoother" than those of Type 1 (one fan). FIG. 18E shows a zoomed in portion of the type 2 test to show the sensors' initial responses. It should be noted that, for better visualization of the response order, all MOS raw responses have each been offset to show approximately zero when background data was being collected at the beginning of the test. The plot also shows the order in which the sensors responded (note that the leak was set nearest node 1 and aimed downstream). For type 2 tests, the sensors seemed to consistently respond in order from Node 1 to 10 (this order is labeled with numbered circles), while for the type 1 tests, the order of response was more difficult to determine. It should be noted that methane was supplied to the face sampling locations for the tests.

Type 3 and 4 tests were completed to assess the response of both methane sensors. To analyze the responses of the IRS and MOS, 20 second averages were taken at the peak response of each sensor. The table of FIG. 18F presents the peak responses along with the percent difference between them. The percent difference values are highlighted for a percent difference lower than ±10% ("good"), a percent difference between ±10% and ±20%, and a percent difference above ±20% ("bad"). Out of the ten sampling nodes, seven were "good" and only one was "bad." The "bad" variation may be attributed to issues with the MOS sensor. It should be noted that due to the shorter response times of the MOS, there was more fluctuation in concentration at the peaks than for the IRS as the MOS were able to respond quicker to the inconsistencies of the methane concentration of the sample.

Figure 18G:
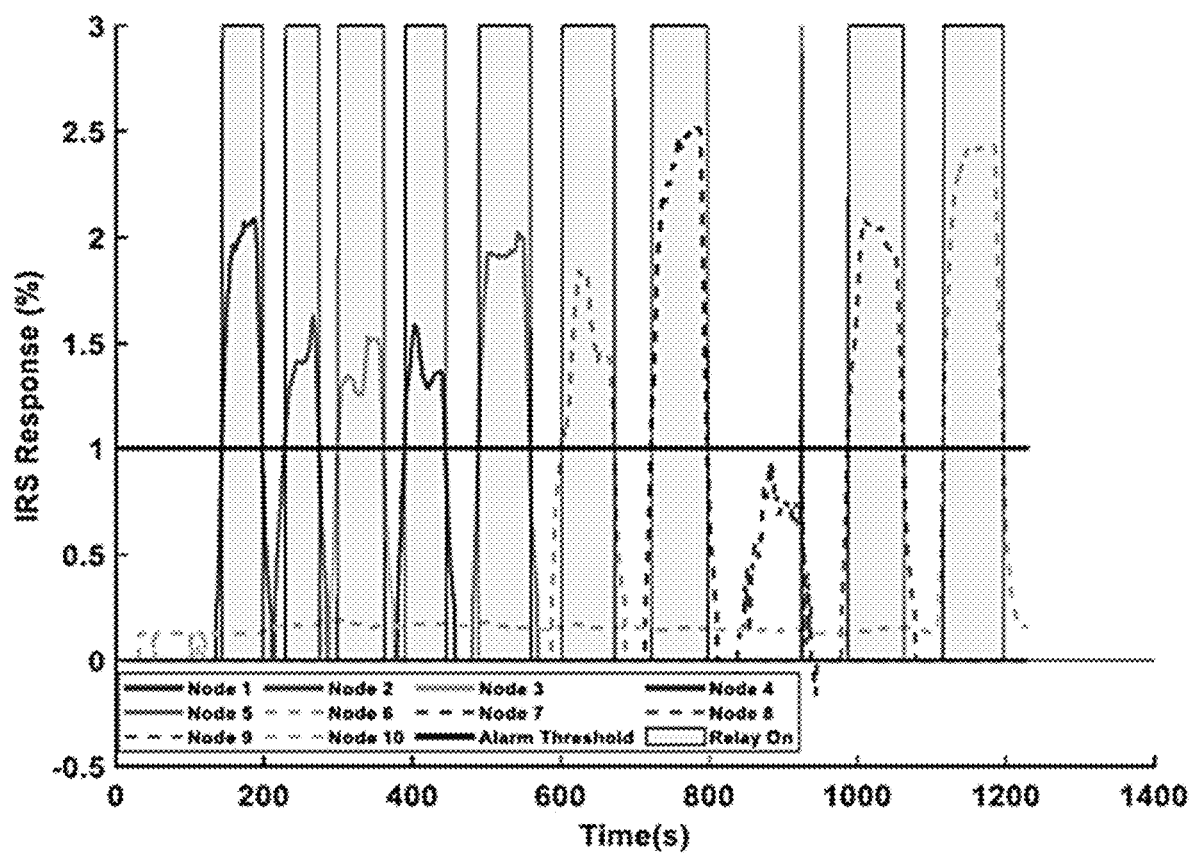

The methane detection system can include an audible alarm and/or visual alarm to notify operators, and the capabilities to control isolated relays. To test that the relay control worked properly, a program was written that turned a relay on and off and set an alarm whenever any of the IRS measured over 1% methane concentration. The display can include gauges indicating methane concentrations at the sensing locations and/or alarm indications when a threshold value is reached and/or exceeded. FIG. 18G shows the results of the alarm tests. When each sensor responded above and then dropped below the threshold of 1% methane, the relay was turned on and off, respectively. The shaded region on the plot represents the time where the relay was turned on. It should be noted that there was a connection issue with the sensor at Node 8 that was resolved for subsequent tests. This test confirmed that the alarm system was working properly.

Deployment and testing of the methane detection system in the mock mine was successful. The system can provide continuous monitoring of climate conditions, which would be beneficial to a mine or other harsh environment. All sensors were calibrated and mounted into each of the 10 sampling units. A flow sensor was also integrated into each sampling unit to ensure consistent and adequate sample flow. Monitoring of the flow rate provides information which could determine issues such as when a filter is clogged/needs replaced or if there are problems with the ejector. Maintaining the flowrate ensures similar and adequate response times for each unit of the system and is beneficial for the integration of predictive controls into the system. Each node of the system was capable of safely and continuously sampling from two locations (face and gob) by use of a three-way valve and filtration at each location. All electrical components in the sampling units utilized low-voltage DC power which was a design parameter for ease of integration onto/into shields. A power consumption test confirmed the 12 VDC 2.5 A (30 W) power supply currently approved and integrated into industry shields could power a sampling unit as each unit had a maximum consumption of around 22 W. Testing in the mock mine confirmed the limits and capabilities of the two methane sensors (MOS and IRS) and the benefits in employing both types in the system. The rise/decay time testing along with the testing utilizing the FFS confirmed the limitations of the IRS, like its longer response time, compared the MOS and its inability to detect methane concentrations less then approximately 0.1%. The ability of the system to control a relay and set an alarm at regulated methane concentrations were successfully demonstrated in the mock mine.

It should be emphasized that the above-described embodiments are merely possible examples of implementations and applications, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

The invention claimed is:

1. A method to quantify a concentration of gas, the method comprising:
   drawing, via a three-way valve, a sample of air from at least one first location, the three-way valve allowing for the sample of air to be drawn from a first side when the three-way valve is energized and a second side when the three-way valve is deenergized, thereby allowing the sample of air to be obtained from different sides of the at least one first location; and
   delivering the sample to a volume within a sensor block at a second location, wherein the sensor block incorporates at least one gas concentration sensor in communication with the volume, and
   wherein a vacuum is applied to the volume within the sensor block to facilitate delivery of the sample to the second location.

2. The method of claim 1, wherein the vacuum is derived from a multi-nozzle eductor or a multi-nozzle ejector enabled by a supply of pressurized fluid.

3. The method of claim 1, wherein the at least one gas concentration sensor comprises at least two gas concentration sensors.

4. The method of claim 3, wherein the at least two gas concentration sensors contain more than one type of gas concentration sensor, wherein each type is capable of measuring a different gas concentration range.

5. The method of claim 1, wherein multiple tubes feed samples to the sensor block at the second location from the at least one first location, and wherein the at least one first location comprises multiple first locations.

6. The method of claim 5, further comprising employing a filter to prevent undesirable ingress of contaminants into a mouth of each tube at the multiple first locations.

7. The method of claim 5, wherein one or more remotely controlled valves enable a selection of sampling tubes that feed sample gas to the sensor block at any point in time.

8. The method of claim 7, wherein the valves are consolidated in a rotary valve body at the second location.

9. The method of claim 5, further comprising selecting a quantitative vacuum, diameter of one or more tubes, and/or a volume of the sensor block to facilitate transmission of the sample from the at least one first location to the sensor block at the second location.

10. The method of claim 1, wherein at least one gas concentration sensor output is conveyed to a central control unit.

11. The method of claim 10, wherein the central control unit outputs a gas concentration measured by the at least one gas concentration sensor.

12. The method of claim 11, further comprising transmitting an operational command for a longwall mining system based on the gas concentration.

13. The method of claim 12, wherein the central control unit commands a decrease in rate or stoppage of an operation of the longwall mining system when a measured or projected concentration of gas exceeds a threshold level.

14. The method of claim 11, wherein the central control unit commands a change in ventilation based on the gas concentration.

15. The method of claim 1, wherein the at least one first location comprises multiple first locations, the method further comprising positioning sampling nodes at the first and second locations, wherein the sampling nodes gather sample flows from the multiple first locations and transmit those sample flows selectively to the second location.

16. A method to quantify a concentration of gas, the method comprising:
   drawing, via three-way valve, a sample of air from at least one first location via at least one sample tube, the three-way valve allowing for the sample of air to be drawn from a first side of the at least one sample tube when the three-way valve is energized and a second side of the at least one sample tube when the three-way valve is deenergized, thereby allowing the sample of air to be obtained from different sides of the at least one first location;
   delivering the sample to a volume within a sensor block at a second location via the at least one sample tube, wherein the sensor block incorporates at least one combustible gas concentration sensor in communication with the volume, wherein at least one pump establishes at least one sample flow from the first location to the second location; and
   communicating a signal from the at least one combustible gas concentration sensor to a control unit at a third location, the signal corresponding to a combustible gas concentration level measured by the at least one combustible gas concentration sensor.

17. The method of claim 16, wherein the control unit generates an alert when the combustible gas concentration level exceeds a threshold level.

18. The method of claim 17, wherein the at least one first location are points on at least one shield of a longwall mining machine.

19. The method of claim 17, wherein the at least one first location are points intermittently located in relation to shearers on a coal mining machine.

20. A system comprising:
   a longwall mining machine;
   at least one sample tube extending from a first location to a second location;
   a sampling unit at the second location, wherein the sampling unit houses a sensor block, wherein the sample tube is coupled to an inlet of the sensor block, wherein the sensor block incorporates at least one gas concentration sensor that is in communication with the inlet;
   an ejector enabled by a supply of pressurized water or air, wherein the ejector facilitates delivery of a sample of air, using a three-way valve for entry of the sample of air into the at least one sample tube, from the first location to the second location via the at least one sample tube, the three-way valve allowing for the sample of air to be drawn from a first side of the at least one sample tube when the three-way valve is energized and a second side of the at least one sample tube when the three-way valve is deenergized, thereby allowing the sample of air to be obtained from different sides of the first location; and
   a control unit in communication with the sampling unit, wherein the control unit is configured to receive a gas concentration sensor output from the sampling unit and output the gas concentration sensor output.

* * * * *